(12) United States Patent
Aoki

(10) Patent No.: US 10,519,839 B2
(45) Date of Patent: Dec. 31, 2019

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi-ken (JP)

(72) Inventor: Keiichiro Aoki, Sunto-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1 day.

(21) Appl. No.: 16/059,179

(22) Filed: Aug. 9, 2018

(65) Prior Publication Data

US 2019/0048775 A1 Feb. 14, 2019

(30) Foreign Application Priority Data

Aug. 10, 2017 (JP) .................................. 2017-155896

(51) Int. Cl.
| | |
|---|---|
| *F01N 9/00* | (2006.01) |
| *F01N 3/10* | (2006.01) |
| *F01N 11/00* | (2006.01) |

(52) U.S. Cl.
CPC ................. *F01N 9/00* (2013.01); *F01N 3/10* (2013.01); *F01N 11/007* (2013.01); *F01N 2550/02* (2013.01); *F01N 2560/02* (2013.01); *F01N 2900/08* (2013.01); *F01N 2900/1402* (2013.01); *F01N 2900/1621* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,164,125 | A * | 12/2000 | Kawase | F02D 41/1494 60/277 |
| 6,880,329 | B2 * | 4/2005 | Iida | F01N 3/10 123/689 |
| 9,664,640 | B2 * | 5/2017 | Yamada | G01N 27/407 |
| 9,765,719 | B2 * | 9/2017 | Umeno | F02D 41/1456 |
| 9,982,614 | B2 * | 5/2018 | Hayashita | F01N 3/101 |
| 10,408,149 | B2 * | 9/2019 | Aoki | F02D 41/1454 |
| 2015/0330323 | A1 | 11/2015 | Aoki | |

FOREIGN PATENT DOCUMENTS

JP 2014-145308 8/2014

* cited by examiner

*Primary Examiner* — Binh Q Tran
(74) *Attorney, Agent, or Firm* — Finnegan, Henderson, Farabow, Garrett & Dunner, LLP

(57) ABSTRACT

An exhaust purification system of an internal combustion engine comprises a catalyst 20, an air-fuel ratio sensor 41, a current detection device 61, a voltage application device 60, a voltage control part 71 and an air-fuel ratio control part 72. The air-fuel ratio control part controls the air-fuel ratio so that the output current of the air-fuel ratio sensor becomes a predetermined target value. The voltage control part performs at least one of voltage lowering control setting the applied voltage to a first voltage lower when the air-fuel ratio becomes higher than a lean judged air-fuel ratio, and a voltage raising control setting the applied voltage to a second voltage when the air-fuel ratio becomes lower than a rich judged air-fuel ratio. The reference voltage is a voltage at which the output current of the air-fuel ratio sensor becomes zero when the air-fuel ratio is the stoichiometric air-fuel ratio.

16 Claims, 14 Drawing Sheets

EXHAUST PURIFICATION SYSTEM OF INTERNAL COMBUSTION ENGINE

FIELD

The present invention relates to an exhaust purification system of an internal combustion engine.

BACKGROUND

It has been known in the past to arrange a catalyst and air-fuel ratio sensor in an exhaust passage of an internal combustion engine and suppress deterioration of the exhaust emission by controlling the air-fuel ratio of the inflowing exhaust gas flowing into the catalyst based on the output of the air-fuel ratio sensor.

For example, in the internal combustion engine described in PTL 1, if the air-fuel ratio detected by a downstream side air-fuel ratio sensor arranged at a downstream side of a catalyst reaches a rich judged air-fuel ratio richer than a stoichiometric air-fuel ratio, a target air-fuel ratio of the inflowing exhaust gas is set to a lean set air-fuel ratio leaner than the stoichiometric air-fuel ratio. On the other hand, if an estimated value of an oxygen storage amount of the catalyst reaches a judged reference storage amount, the target air-fuel ratio of the inflowing exhaust gas is set to a rich set air-fuel ratio richer than the stoichiometric air-fuel ratio. The estimated value of the oxygen storage amount of the catalyst is calculated based on the output of an upstream side air-fuel ratio sensor arranged at an upstream side of the catalyst.

Further, in the internal combustion engine described in PTL 1, a voltage applied to the downstream side air-fuel ratio sensor is controlled so as to precisely detect the air-fuel ratio of the outflowing exhaust gas flowing out from the catalyst. Specifically, when the target air-fuel ratio of the inflowing exhaust gas is richer than a reference air-fuel ratio, the voltage applied to the downstream side air-fuel ratio sensor is made a voltage higher than the voltage at which the output current becomes zero when the air-fuel ratio of the outflowing exhaust gas is the stoichiometric air-fuel ratio. On the other hand, when the target air-fuel ratio of the inflowing exhaust gas is leaner than the reference air-fuel ratio, it is made a voltage lower than the voltage at which the output current becomes zero when the air-fuel ratio of the outflowing exhaust gas is the stoichiometric air-fuel ratio.

CITATION LIST

Patent Literature

PTL 1: Japanese Patent Publication No. 2014-145308A

SUMMARY

Technical Problem

However, in the internal combustion engine described in PTL 1, as explained above, after the estimated value of the oxygen storage amount of the catalyst reaches the judged reference storage amount, the target air-fuel ratio of the inflowing exhaust gas is set to the rich set air-fuel ratio until the air-fuel ratio of the outflowing exhaust gas reaches the rich judged air-fuel ratio. For this reason, the oxygen in the catalyst is liable to become depleted and therefore a large amount of unburned gas (HC, CO, etc.) is liable to flow out from the catalyst resulting in deterioration of the exhaust emission.

Therefore, an object of the present invention is to provide an exhaust purification system of an internal combustion engine able to suppress deterioration of the exhaust emission.

Solution to Problem

The summary of the present disclosure is as follows.

(1) An abnormality diagnosis system of an ammonia detection device arranged in an exhaust passage of an internal combustion engine at a downstream side of a catalyst in a direction of flow of exhaust, comprising: an air-fuel ratio detection device arranged in the exhaust passage at the downstream side of the catalyst in the direction of flow of exhaust; an air-fuel ratio control part configured to control an air-fuel ratio of inflowing exhaust gas flowing into the catalyst; and an abnormality judgment part configured to judge abnormality of the ammonia detection device, wherein the air-fuel ratio control part is configured to perform rich control making the air-fuel ratio of the inflowing exhaust gas richer than a stoichiometric air-fuel ratio so that an oxygen storage amount of the catalyst decreases, and the abnormality judgment part is configured to judge that the ammonia detection device is abnormal if, after start of the rich control, an output value of the ammonia detection device does not rise to a reference value before the air-fuel ratio detected by the air-fuel ratio detection device falls to a rich judged air-fuel ratio richer than a stoichiometric air-fuel ratio.

(2) The exhaust purification system of an internal combustion engine described in above (1), wherein the target value is zero.

(3) The exhaust purification system of an internal combustion engine described in above (1) or (2), wherein the voltage control part is configured to perform the voltage lowering control and the first voltage is 0.15V to 0.44V.

(4) The exhaust purification system of an internal combustion engine described in any one of above (1) to (3), wherein the voltage control part is configured to perform the voltage raising control and the second voltage is 0.46V to 0.7V.

(5) The exhaust purification system of an internal combustion engine described in any one of above (1) to (4), further comprising an intake air amount detection device detecting an intake air amount or an intake air amount estimating part configured to estimate the intake air amount, wherein the voltage control part is configured to perform the voltage lowering control and lower the first voltage the greater the intake air amount.

(6) The exhaust purification system of an internal combustion engine described in any one of above (1) to (5), further comprising a catalyst judging part configured to judge a degree of deterioration of the catalyst, wherein the voltage control part is configured to perform the voltage lowering control and lower the first voltage the greater the degree of deterioration of the catalyst.

(7) The exhaust purification system of an internal combustion engine described in any one of above (1) to (6), further comprising an intake air amount detection device detecting an intake air amount or an intake air amount estimating part configured to estimate the intake air amount, wherein the voltage control part is configured to perform the voltage raising control and raise the second voltage the greater the intake air amount.

(8) The exhaust purification system of an internal combustion engine described in any one of above (1) to (7), further comprising a catalyst judging part configured to judge a degree of deterioration of the catalyst, wherein the voltage control part is configured to perform the voltage raising control and raise the second voltage the greater the degree of deterioration of the catalyst.

Advantageous Effects of Invention

According to the present invention, there is provided an exhaust purification system of an internal combustion engine able to suppress deterioration of the exhaust emission.

DESCRIPTION OF EMBODIMENTS

Figure 1:
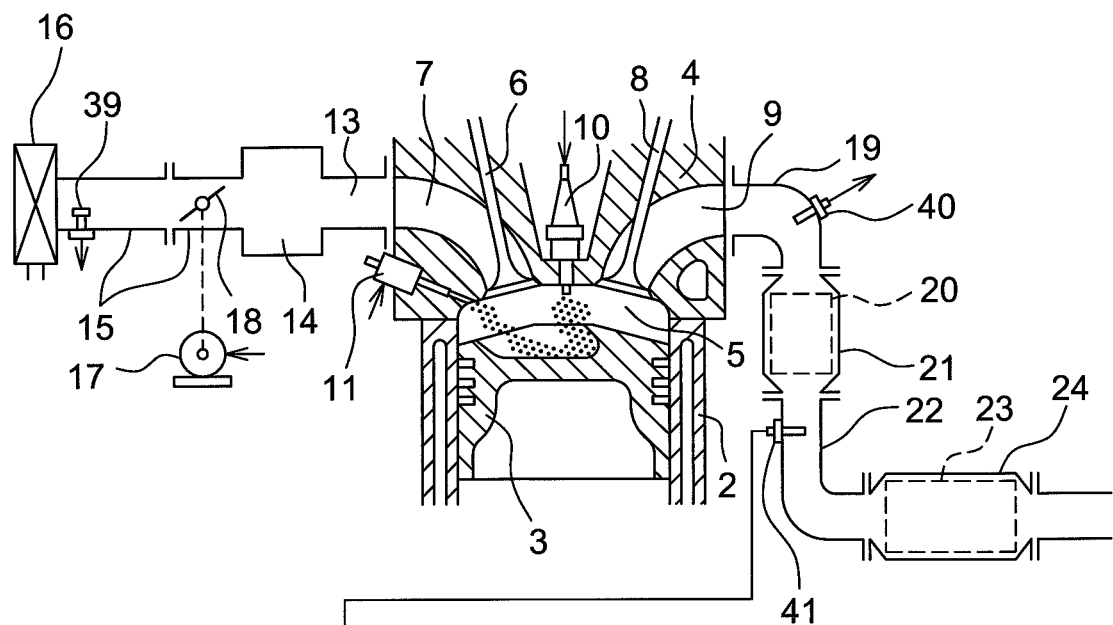
FIG. 1 is a view schematically showing an internal combustion engine in which an exhaust purification system of an internal combustion engine according to a first embodiment of the present invention is provided.
Figure 1:
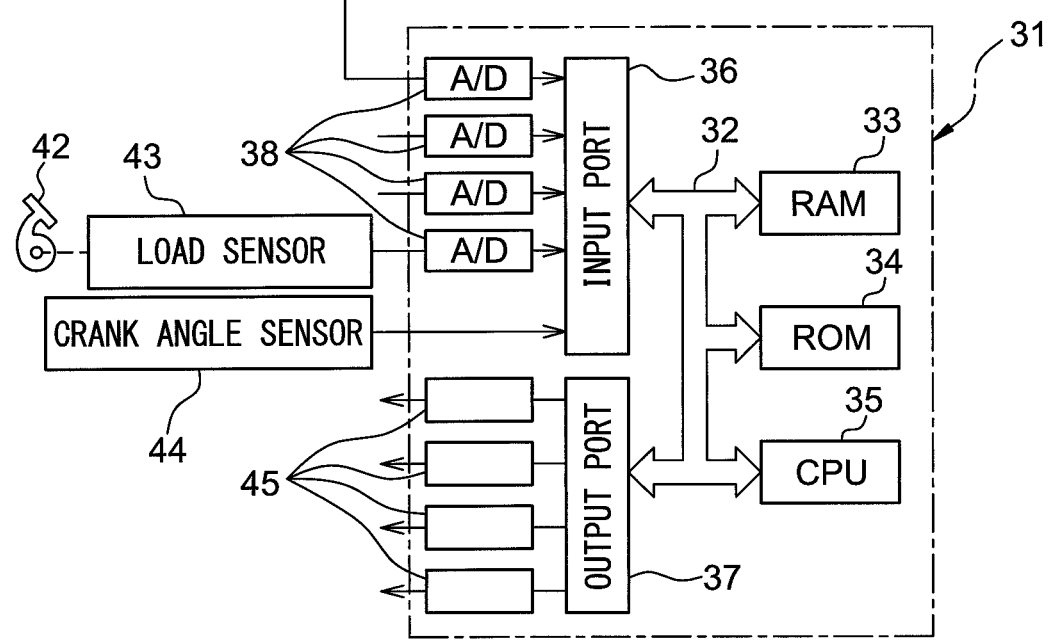

Below, referring to the figures, embodiments of the present invention will be explained in detail. Note that, in the following explanation, similar components are assigned the same reference numerals.

First Embodiment

First, referring to FIG. 1 to FIG. 13, a first embodiment of the present invention will be explained.

Explanation of Internal Combustion Engine Overall

FIG. 1 is a view schematically showing an internal combustion engine provided with an exhaust purification system of an internal combustion engine according to a first embodiment of the present invention. The internal combustion engine shown in FIG. 1 is a spark ignition type internal combustion engine. The internal combustion engine is mounted in a vehicle.

Referring to FIG. 1, 2 indicates a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 injects a predetermined amount of fuel into the combustion chamber 5 in accordance with an injection signal. In the present embodiment, as the fuel, gasoline with a stoichiometric air-fuel ratio of 14.6 is used.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, intake pipe 15, etc., form an intake passage which leads air to the combustion chamber 5. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which has an upstream side catalyst 20 built into it. The upstream side casing 21 is connected to a downstream side casing 23 which has a downstream side catalyst 24 built into it via an exhaust pipe 22. The exhaust port 9, exhaust manifold 19, upstream side casing 21, exhaust pipe 22, downstream side casing 23, etc., form an exhaust passage which discharges exhaust gas produced due to combustion of the air-fuel mixture in the combustion chamber 5.

Various control routines of the internal combustion engine are performed by an electronic control unit (ECU) 31. The ECU 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 detecting the flow rate of air which flows through the intake pipe 15 is arranged. The output of the air flow meter 39 is input through a corresponding AD converter 38 to the input port 36.

Further, at the header of the exhaust manifold 19, i.e., a upstream side of the upstream side catalyst 20 in the direction of flow of exhaust, an upstream side air-fuel ratio sensor 40 detecting the air-fuel ratio of the exhaust gas which flows through the inside of the exhaust manifold 19 (that is, the exhaust gas which flows into the upstream side catalyst 20) is arranged. The output of the upstream air-fuel ratio sensor 40 is input through the corresponding AD converter 38 to the input port 36.

Further, inside the exhaust pipe 22, that is, at the downstream side of the upstream side catalyst 20 in the direction of flow of exhaust, a downstream side air-fuel ratio sensor 41 for detecting an air-fuel ratio of the exhaust gas flowing through the inside of the exhaust pipe 22 (that is, exhaust gas flowing out from the upstream side catalyst 20) is arranged. The output of the downstream side air-fuel ratio sensor 41 is input through a corresponding AD converter 38 to the input port 36.

Further, an accelerator pedal 42 is connected to a load sensor 43 generating an output voltage proportional to the amount of depression of the accelerator pedal 42. The output voltage of the load sensor 43 is input through a corresponding AD converter 38 to the input port 36. A crank angle sensor 44 generates an output pulse every time the crankshaft rotates, for example, by 15 degrees. This output pulse is input to the input port 36. In the CPU 35, the engine speed is calculated from the output pulse of the crank angle sensor 44. On the other hand, the output port 37 is connected through corresponding drive circuits 45 to the spark plugs 10, fuel injectors 11, and the throttle valve drive actuator 17.

Note that, the above-mentioned internal combustion engine is a nonsupercharged internal combustion engine fueled by gasoline, but the configuration of the internal combustion engine is not limited to the above configuration. Therefore, the cylinder array, mode of injection of fuel, configuration of the intake and exhaust systems, configuration of the valve operating mechanism, presence of any supercharger, and other specific parts of the configuration of the internal combustion engine may differ from the configuration shown in FIG. 1. For example, the fuel injectors 11 may be arranged to inject fuel into the intake ports 7.

Explanation of Catalysts

The upstream side catalyst 20 and the downstream side catalyst 24 arranged in the exhaust passage have similar configurations. The catalysts 20 and 24 are catalysts having oxygen storage abilities, for example, three-way catalysts. Specifically, the catalysts 20 and 24 are comprised of carriers made of ceramic on which a precious metal having a catalytic action (for example, platinum (Pt)) and a co-catalyst having an oxygen storage ability (for example, ceria ($CeO_2$)) are carried.

Figure 2:
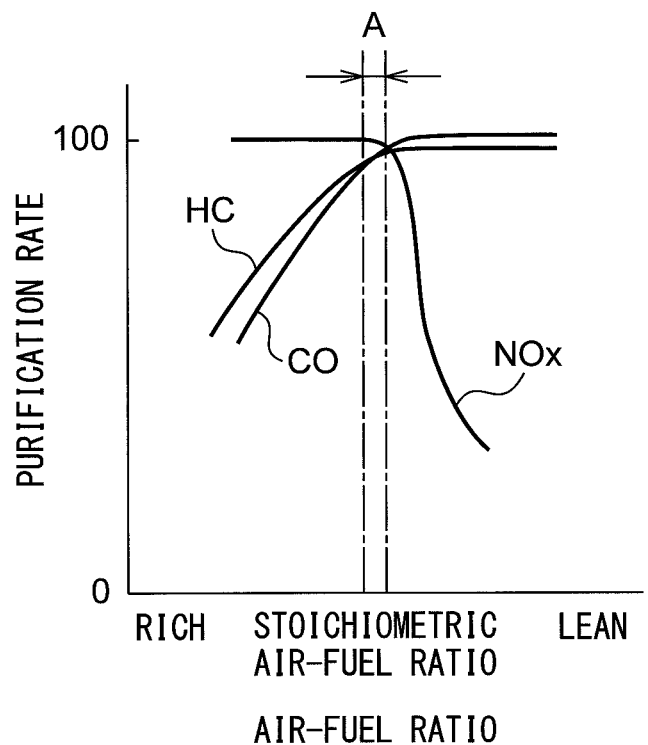
FIG. 2 is a view showing purification characteristics of a three-way catalyst.

FIG. 2 shows the purification characteristics of a three-way catalyst. As shown in FIG. 2, the purification rates of unburned gas (HC, CO) and nitrogen oxides ($NO_X$) by the catalysts 20 and 24 become extremely high when the air-fuel ratio of the exhaust gas flowing into the catalysts 20 and 24 is in the region near the stoichiometric air-fuel ratio (purification window A in FIG. 2). Therefore, the catalysts 20 and 24 can effectively remove unburned gas and $NO_X$ if the air-fuel ratio of the exhaust gas is maintained at the stoichiometric air-fuel ratio.

Further, the catalysts 20 and 24 store or release oxygen in accordance with the air-fuel ratio of the exhaust gas by the co-catalyst. Specifically, the catalysts 20 and 24 store excess oxygen in the exhaust gas when the air-fuel ratio of the exhaust gas is leaner than the stoichiometric air-fuel ratio. On the other hand, the catalysts 20 and 24 release the amount of additional oxygen required for making the unburned gas oxidize when the air-fuel ratio of the exhaust gas is richer than the stoichiometric air-fuel ratio. As a result, even if the air-fuel ratio of the exhaust gas is somewhat off from the stoichiometric air-fuel ratio, the air-fuel ratio on the surface of the catalysts 20 and 24 is maintained near the stoichiometric air-fuel ratio and the unburned gas and nitrogen oxides are effectively removed at the catalysts 20 and 24.

Note that, so long as the catalysts 20 and 24 have catalytic actions and oxygen storage abilities, they may be catalysts other than three-way catalysts.

Configuration of Air-Fuel Ratio Sensors

Figure 3:
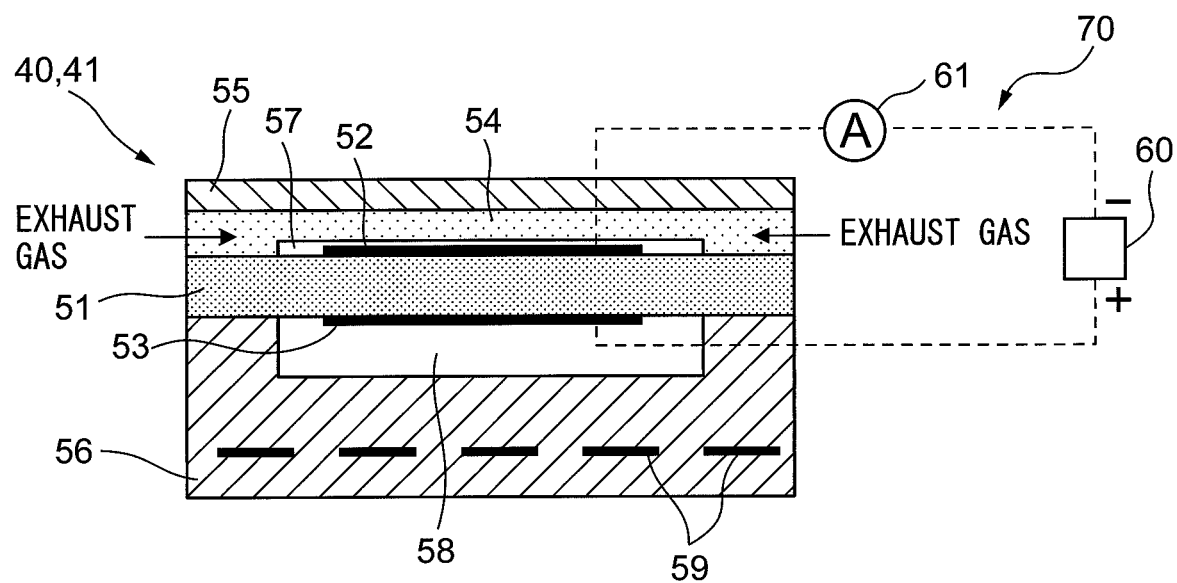
FIG. 3 is a schematic cross-sectional view of an air-fuel ratio sensor.

The upstream side air-fuel ratio sensor 40 and the downstream side air-fuel ratio sensor 41 have similar configurations. FIG. 3 is a schematic cross-sectional view of the air-fuel ratio sensors 40 and 41. As will be understood from FIG. 3, in the present embodiment, each of the air-fuel ratio sensors 40 and 41 is a single-cell type air-fuel ratio sensor with a single cell comprised of a solid electrolyte layer and a pair of electrodes.

As shown in FIG. 3, each of the air-fuel ratio sensors 40 and 41 is provided with a solid electrolyte layer 51, an exhaust side electrode 52 arranged at one side surface of the solid electrolyte layer 51, an atmosphere side electrode 53 arranged at the other side surface of the solid electrolyte layer 51, a diffusion regulating layer 54 regulating diffusion of the exhaust gas, a protective layer 55 protecting the diffusion regulating layer 54, and a heater part 56 heating the air-fuel ratio sensor 40 or 41.

The diffusion regulating layer 54 is provided on one side surface of the solid electrolyte layer 51. The protective layer 55 is provided on the opposite side surface to the side surface at the solid electrolyte layer 51 side of the diffusion regulating layer 54. In the present embodiment, a measured gas chamber 57 is formed between the solid electrolyte layer 51 and the diffusion regulating layer 54. A part of the exhaust gas flowing through the exhaust passage is introduced through the diffusion regulating layer 54 to the measured gas chamber 57. Further, the exhaust side electrode 52 is arranged inside the measured gas chamber 57. Therefore, the exhaust side electrode 52 is exposed to the exhaust gas through the diffusion regulating layer 54. Note that, the measured gas chamber 57 does not necessarily have to be provided. Each of the air-fuel ratio sensors 40 and 41 may be configured so that the diffusion regulating layer 54 directly contacts the surface of the exhaust side electrode 52.

The heater part 56 is provided on the other side surface of the solid electrolyte layer 51. The reference gas chamber 58 is formed between the solid electrolyte layer 51 and the heater part 56. Reference gas is introduced into the reference gas chamber 58. In the present embodiment, the reference gas chamber 58 is open to the atmosphere. As the reference gas, air is introduced into the reference gas chamber 58. The atmosphere side electrode 53 is arranged inside the reference gas chamber 58. Therefore, the atmosphere side electrode 53 is exposed to the reference gas (air).

The heater part 56 is provided with a plurality of heaters 59. Due to the heaters 59, it is possible to control the temperature of each of the air-fuel ratio sensors 40 and 41, in particular the temperature of the solid electrolyte layer 51. The heater part 56 has a sufficient heat generating capacity for heating the solid electrolyte layer 51 until it is activated.

The solid electrolyte layer 51 is a sheet member having oxide ion conductivity. The solid electrolyte layer 51, for example, is a sintered body of $ZrO_2$ (zirconia), $HfO_2$, $ThO_2$, $Bi_2O_3$, etc., to which CaO, MgO, $Y_2O_3$, $Yb_2O_3$, etc., is added as a stabilizer. Further, the diffusion regulating layer 54 is formed by a porous sintered body of alumina, magnesia, silicon, spinel, mullite, or other heat resistant inorganic substances. Furthermore, the exhaust side electrode 52 and atmosphere side electrode 53 are formed from platinum or other precious metals with high catalytic activities.

Further, the exhaust side electrode 52 and atmosphere side electrode 53 are connected to an electrical circuit 70. The electrical circuit 70 includes a voltage application device 60 and current detection device 61. The voltage application device 60 applies voltage to each of the air-fuel ratio sensors 40 and 41 so that the potential of the atmosphere side electrode 53 becomes higher than the potential of the exhaust side electrode 52. Therefore, the exhaust side electrode 52 functions as a negative electrode, while the atmosphere side electrode 53 functions as a positive electrode. The output port 37 of the ECU 31 is connected through a corresponding drive circuit 45 to the voltage application device 60. Therefore, the ECU 31 can control the voltage applied to the air-fuel ratio sensor 40 through the voltage application device 60.

Further, the current detection device 61 detects the current flowing between the exhaust side electrode 52 and the atmosphere side electrode 53, that is, the output current of each of the air-fuel ratio sensors 40 and 41. The output of the current detection device 61 is input through the corresponding AD converter 38 to the input port 36 of the ECU 31. Therefore, the ECU 31 can acquire the output current of each of the air-fuel ratio sensors 40 and 41 detected by the current detection device 61 from the current detection device 61.

Operation of Air-Fuel Ratio Sensors

Next, referring to FIG. 4, the basic operation of each of the air-fuel ratio sensors 40 and 41 will be explained. FIG. 4 is a view schematically showing the operation of each of the air-fuel ratio sensors 40 and 41. Each of the air-fuel ratio sensors 40 and 41 is arranged in the exhaust passage so that the outer circumferential surfaces of the protective layer 55 and the diffusion regulating layer 54 are exposed to the exhaust gas. Further, air is introduced into the reference gas chamber 58 of each of the air-fuel ratio sensors 40 and 41.

As explained above, the solid electrolyte layer 51 has oxide ion conductivity. For this reason, if a difference in oxygen concentration arises between the two side surfaces of the activated solid electrolyte layer 51, an electromotive force E is generated trying to make the oxide ions move from the high concentration side surface side to the low concentration side surface side. Such a characteristic is called the "oxygen cell characteristic".

On the other hand, if a potential difference is given between the two side surfaces of the solid electrolyte layer 51, oxide ions move so that a ratio of oxygen concentration corresponding to the potential difference is caused between the two side surfaces of the solid electrolyte layer. This characteristic is called the "oxygen pumping characteristic".

Figure 4A:
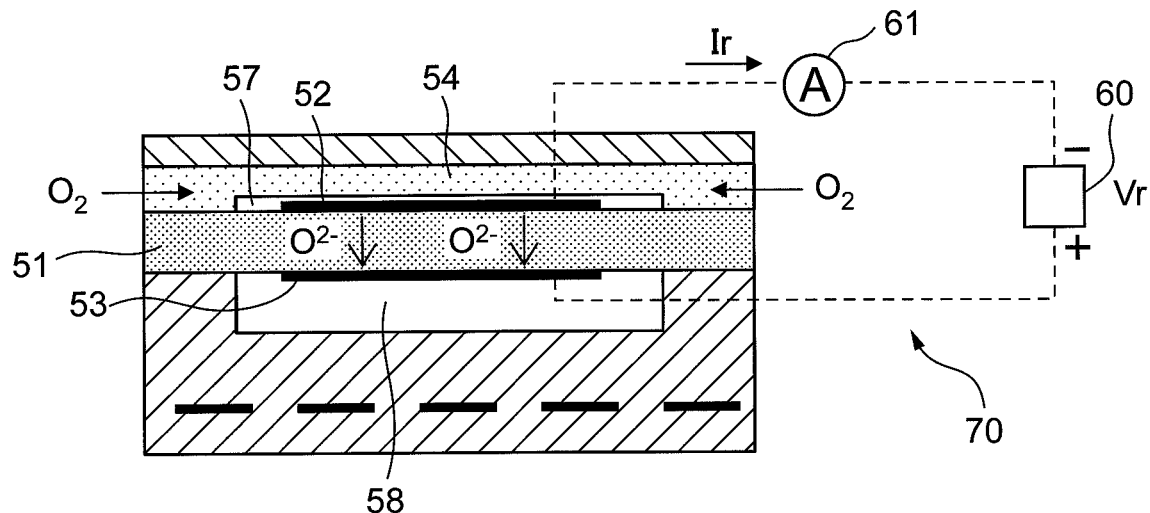
FIG. 4A is a view schematically showing an operation of an air-fuel ratio sensor.

When the air-fuel ratio of the exhaust gas flowing into each of the air-fuel ratio sensors 40 and 41 is leaner than the stoichiometric air-fuel ratio, since the oxygen concentration in the exhaust gas is high, the ratio of oxygen concentration between the two side surfaces of the solid electrolyte layer 51 will not become that large. For this reason, if setting the voltage Vr applied to each of the air-fuel ratio sensors 40 and 41 to a suitable value, the ratio of oxygen concentration between the two side surfaces of the solid electrolyte layer 51 will become smaller than the ratio of oxygen concentration corresponding to the sensor applied voltage Vr. For this reason, as shown in FIG. 4A, oxide ions will move from the exhaust side electrode 52 toward the atmosphere side electrode 53 so that the ratio of oxygen concentration between the two side surfaces of the solid electrolyte layer 51 approaches the ratio of oxygen concentration corresponding to the sensor applied voltage Vr. As a result, current Ir flows from the positive electrode of the voltage application device 60 to the negative electrode of the voltage application device 60. At this time, a positive current is detected by the current detection device 61. Further, the value of the current Ir becomes larger the higher the oxygen concentration in the exhaust gas flowing into the measured gas chamber 57, that is, the higher the air-fuel ratio of the exhaust gas.

Figure 4B:
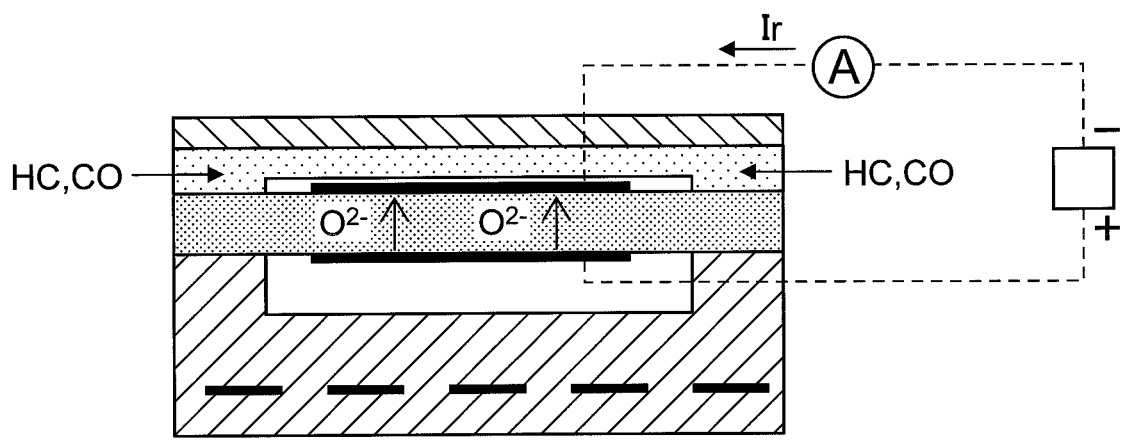
FIG. 4B is a view schematically showing an operation of an air-fuel ratio sensor.

On the other hand, when the air-fuel ratio of the exhaust gas flowing into each of the air-fuel ratio sensors 40 and 41 is richer than the stoichiometric air-fuel ratio, the oxygen on the exhaust side electrode 52 is removed by reacting with the unburned gas in the exhaust gas. For this reason, the oxygen concentration at the exhaust side electrode 52 becomes extremely low and the ratio of oxygen concentration between the two side surfaces of the solid electrolyte layer 51 becomes larger. For this reason, if setting the sensor applied voltage Vr to a suitable value, the ratio of oxygen concentration between the two side surfaces of the solid electrolyte layer 51 becomes greater than the ratio of oxygen concentration corresponding to the sensor applied voltage Vr. For this reason, as shown in FIG. 4B, oxide ions move from the atmosphere side electrode 53 toward the exhaust side electrode 52 so that the ratio of oxygen concentration between the two side surfaces of the solid electrolyte layer 51 approaches the ratio of oxygen concentration corresponding to the sensor applied voltage Vr. As a result, a current Jr flows from the negative electrode of the voltage application device 60 to the positive electrode of the voltage application device 60. At this time, a negative current is detected by the current detection device 61. Further, the absolute value of the current Ir becomes larger the higher the concentration of unburned gas in the exhaust gas flowing into the measured gas chamber 57, that is, the lower the air-fuel ratio of the exhaust gas.

Figure 4C:
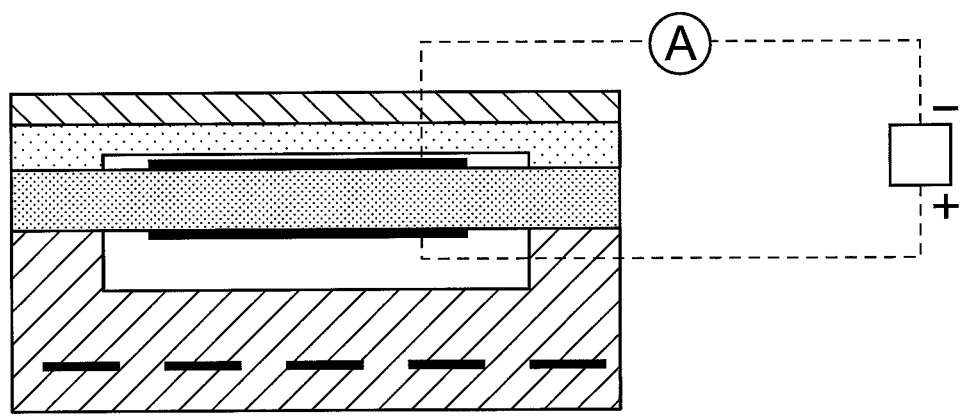
FIG. 4C is a view schematically showing an operation of an air-fuel ratio sensor.

Further, when the air-fuel ratio of the exhaust gas flowing into each of the air-fuel ratio sensors 40 and 41 is the stoichiometric air-fuel ratio, the amounts of the oxygen and unburned gas in the exhaust gas become the chemical equivalent ratio. For this reason, due to the catalytic action of the exhaust side electrode 52, the two completely burn and the ratio of oxygen concentration between the two side surfaces of the solid electrolyte layer 51 is maintained at the ratio of oxygen concentration corresponding to the applied voltage Vr. For this reason, as shown in FIG. 4C, no movement of oxide ions due to the oxygen pumping characteristic occurs and the current detected by the current detection device 61 becomes zero.

Therefore, the value of the output current of each of the air-fuel ratio sensors 40 and 41 fluctuates according to the air-fuel ratio of the exhaust gas flowing into each of the air-fuel ratio sensors 40 and 41. For this reason, the ECU 31 can estimate the air-fuel ratio of the exhaust gas based on the current detected by the current detection device 61. Note that, "the air-fuel ratio of the exhaust gas" means the ratio of the mass of air to the mass of fuel supplied until the exhaust gas is produced (mass of air/mass of fuel) and is estimated from the components of the exhaust gas.

Specific Example of Electrical Circuit

Figure 5:
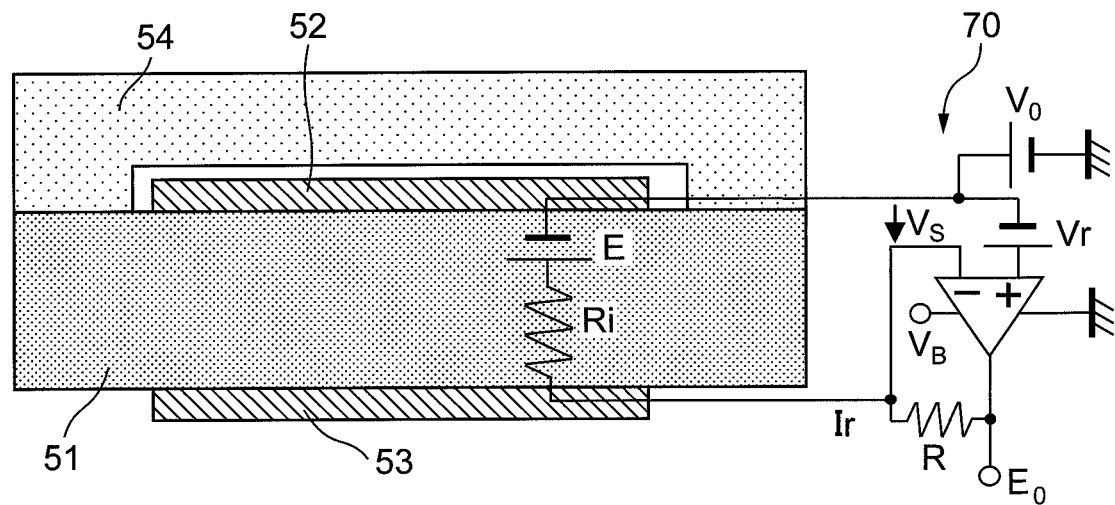
FIG. 5 shows a specific example of an electrical circuit.

FIG. 5 shows a specific example of the electrical circuit 70. In the illustrated example, the electromotive force generated due to the oxygen cell characteristic is shown as E, the internal resistance of the solid electrolyte layer 51 is shown as Ri, the potential difference between the electrodes 52 and 53 is shown as Vs, and the sensor applied voltage applied by the voltage application device 60 to each of the air-fuel ratio sensors 40 and 41 is shown as Vr.

As will be understood from FIG. 5, the voltage application device 60 basically performs negative feedback control so that the electromotive force E generated due to the oxygen cell characteristic matches the sensor applied voltage Vr. The voltage application device 60 performs negative feedback control so that even when a change in the ratio of oxygen concentration between the two side surfaces of the solid electrolyte layer 51 causes a change in the potential difference Vs between the two electrodes 52 and 53, the potential difference Vs becomes the sensor applied voltage Vr.

When the air-fuel ratio of the exhaust gas is the stoichiometric air-fuel ratio and the ratio of oxygen concentration between the two side surfaces of the solid electrolyte layer 51 does not change, the ratio of oxygen concentration between the two side surfaces of the solid electrolyte layer 51 becomes the ratio of oxygen concentration corresponding to the sensor applied voltage Vr. In this case, the electromotive force E and potential difference Vs match the sensor applied voltage Vr, so no current Ir flows.

On the other hand, when the air-fuel ratio of the exhaust gas is an air-fuel ratio different from the stoichiometric air-fuel ratio and the ratio of oxygen concentration between the two side surfaces of the solid electrolyte layer 51 changes, the ratio of oxygen concentration between the two side surfaces of the solid electrolyte layer 51 differs from the ratio of oxygen concentration corresponding to the sensor applied voltage Vr. In this case, the electromotive force E becomes a value different from the sensor applied voltage Vr. As a result, due to the negative feedback control, a potential difference Vs is given between the electrodes 52 and 53 so as to make the oxide ions move between the two side surfaces of the solid electrolyte layer 51 so that the electromotive force E matches the sensor applied voltage Vr. Further, current Ir flows along with movement of the oxide ions. As a result, the electromotive force E converges at the sensor applied voltage Vr and the potential difference Vs also converges at the sensor applied voltage Vr.

Further, the current detection device 61 detects the voltage $E_0$ for detecting the current Ir. Here, $E_0$ is expressed by the following formula (1):

$$E_0 = Vr + V_0 + IrR \qquad (1)$$

where, $V_0$ is the offset voltage (for example 3V) applied so that $E_0$ does not become a negative value, while R is the value of the resistance shown in FIG. 5.

In formula (1), since the sensor applied voltage Vr, offset voltage $V_0$, and resistance value R are constant, the voltage $E_0$ changes depending on the current Ir. Therefore, the current detection device 61 can calculate the current Ir based on the voltage $E_0$.

Note that, the electrical circuit 70 may differ from the configuration shown in FIG. 5 so long as applying voltage to each of the air-fuel ratio sensors 40 and 41 and detecting the output current of each of the air-fuel ratio sensors 40 and 41.

Output Characteristic of Air-Fuel Ratio Sensors

Figure 6:
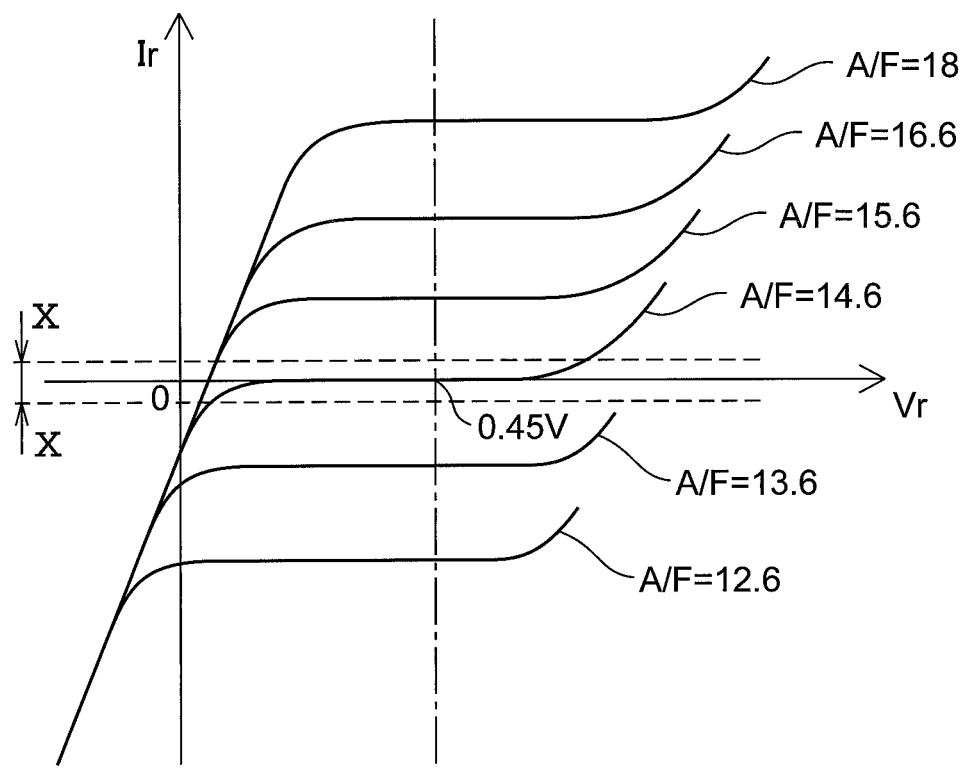
FIG. 6 is a view showing a voltage-current characteristic of an air-fuel ratio sensor.

As a result of the above-mentioned principle, each of the air-fuel ratio sensors 40 and 41 has the voltage-current (V-I) characteristic such as shown in FIG. 6. As shown in FIG. 6, in the region where the sensor applied voltage Vr is 0 or less and near 0, if the exhaust air-fuel ratio is constant, the output current Ir becomes larger the higher the sensor applied voltage Vr. Note that, the voltage region where the output current Ir changes proportionally to the sensor applied voltage Vr is called the "proportional region".

In the proportional region, the sensor applied voltage Vr is low, so the flow rate of oxide ions able to move through the solid electrolyte layer 51 is small. In this case, the speed of movement of oxide ions moving through the inside of the solid electrolyte layer 51 along with application of voltage becomes slower than the speed of introduction of exhaust gas introduced into the measured gas chamber 57 through the diffusion regulating layer 54. For this reason, the flow rate of oxide ions able to move through the solid electrolyte layer 51 changes according to the sensor applied voltage Vr, while the output current Ir increases along with increase of the sensor applied voltage Vr. Note that, the output current Ir becomes a negative value when the sensor applied voltage Vr is 0, since an electromotive force corresponding to the ratio of oxygen concentration between the two side surfaces of the solid electrolyte layer 51 occurs due to the oxygen cell characteristic.

As shown in FIG. 6, if the sensor applied voltage Vr becomes a predetermined value or more, the output current Ir is maintained at a substantially constant value regardless of the value of the sensor applied voltage Vr. This saturated current is called the "limit current", while the voltage region where this limit current arises is called the "limit current region". In the limit current region, the sensor applied voltage Vr is higher than the proportional region, so the flow rate of oxide ions able to move through the solid electrolyte layer 51 becomes greater than the proportional region. In this case, the speed of movement of oxide ions moving through the inside of the solid electrolyte layer 51 along with application of voltage becomes faster than the speed of introduction of exhaust gas introduced into the measured gas chamber 57 through the diffusion regulating layer 54. For this reason, the flow of oxide ions able to move through the solid electrolyte layer 51 does not change much at all according to the sensor applied voltage Vr, so the output current Ir is maintained at a substantially constant value regardless of the value of the sensor applied voltage Vr. On the other hand, the flow rate of oxide ions able to move through the solid electrolyte layer 51 changes according to the ratio of oxygen concentration between the two side surfaces of the solid electrolyte layer 51, so the output current Ir changes according to the air-fuel ratio of the exhaust gas.

As shown in FIG. 6, in the region where the sensor applied voltage Vr is extremely high, if the exhaust air-fuel ratio is constant, the output current Ir becomes larger the higher the sensor applied voltage Vr. If the sensor applied voltage Vr becomes extremely high, the water in the exhaust gas is decomposed at the exhaust side electrode 52. The oxide ions generated due to the decomposition of water move through the inside of the solid electrolyte layer 51 from the exhaust side electrode 52 to the atmosphere side electrode 53. As a result, the current due to the decomposition of water is also detected as the output current Ir, so the output current Ir becomes larger than the limit current. This voltage region is called the "moisture decomposition region".

Figure 7:
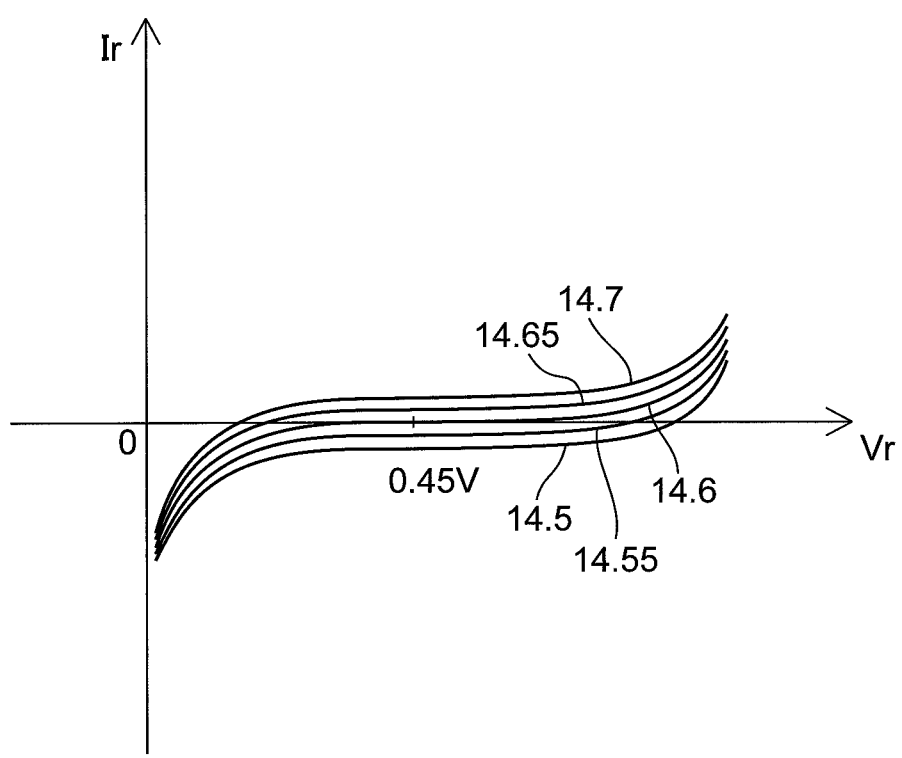
FIG. 7 is a view showing a voltage-current characteristic in an X-X region of FIG. 6.

FIG. 7 is a view showing the voltage-current characteristic in the X-X region of FIG. 6. As will be understood from FIG. 7, even in the limit current region, when the air-fuel ratio of the exhaust gas is constant, the output current Ir becomes slightly greater as the sensor applied voltage Vr becomes higher. For this reason, the value of the sensor applied voltage Vr when the output current Ir becomes zero changes in accordance with the air-fuel ratio of the exhaust gas.

For example, if the air-fuel ratio of the exhaust gas is the stoichiometric air-fuel ratio (14.6), the value of the sensor applied voltage Vr when the output current Ir becomes zero is 0.45V. If the air-fuel ratio of the exhaust gas is lower than the stoichiometric air-fuel ratio (richer), the value of the sensor applied voltage Vr when the output current Ir becomes zero is higher than 0.45V. On the other hand, if the air-fuel ratio of the exhaust gas is higher than the stoichiometric air-fuel ratio (is leaner), the value of the sensor applied voltage Vr when the output current Ir becomes zero is lower than 0.45V.

Figure 8:
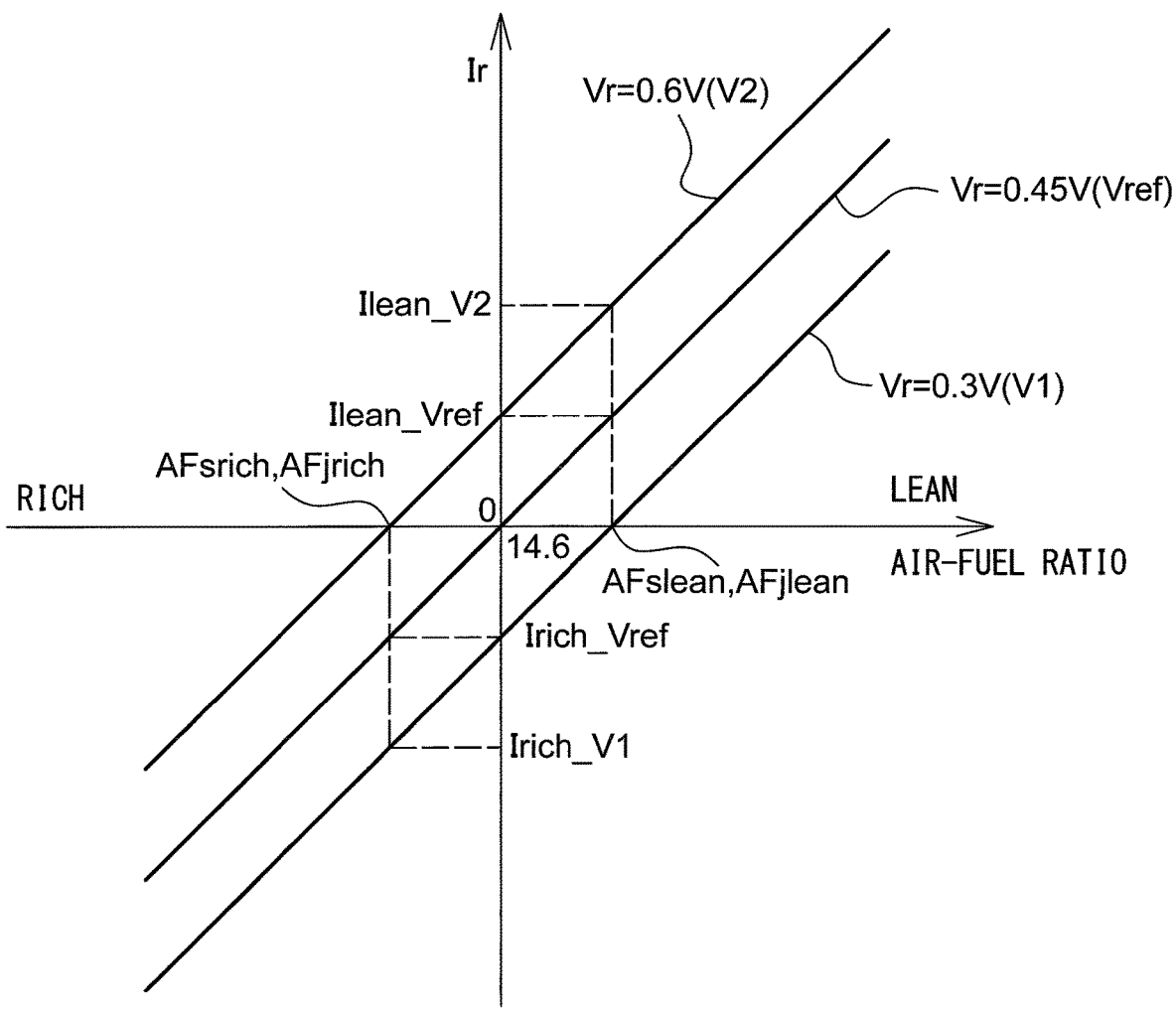
FIG. 8 is a graph showing a relationship of an air-fuel ratio of exhaust gas and an output current.
Figure 9:
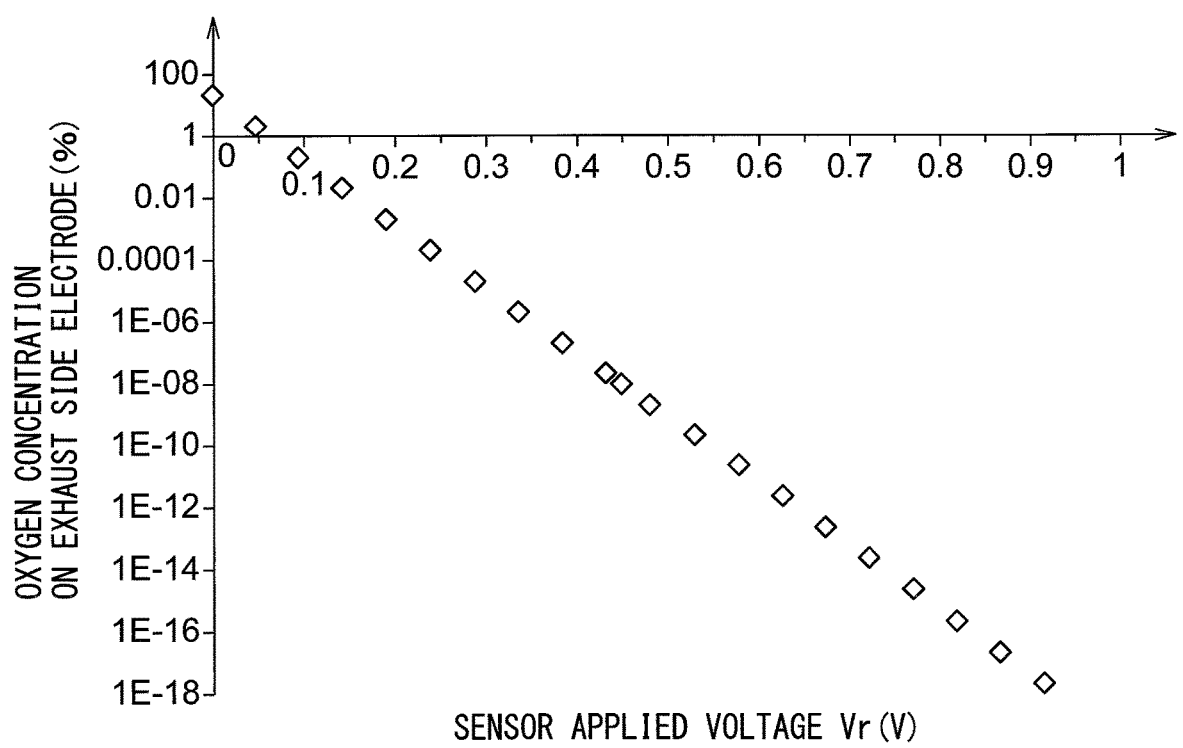
FIG. 9 is a graph showing a relationship of a sensor applied voltage when an output current is zero and an oxygen concentration on an exhaust side electrode.

FIG. 8 is a graph showing the relationship between the air-fuel ratio of the exhaust gas and the output current Ir. In FIG. 8, the region near the stoichiometric air-fuel ratio is enlarged. FIG. 8 shows the relationships between the air-fuel ratio of the exhaust gas and the output current Ir when the sensor applied voltage Vr is 0.3V, 0.45V, and 0.6V. FIG. 9 is a graph showing the relationship between the sensor applied voltage Vr and oxygen concentration on the exhaust side electrode when the output current is zero. In FIG. 9, the y-axis (oxygen concentration on exhaust side electrode) shows the log. The richer the air-fuel ratio of the exhaust gas, the lower the oxygen concentration on the exhaust side electrode. As will be understood from FIG. 8 and FIG. 9, as the sensor applied voltage Vr becomes higher, the air-fuel ratio of the exhaust gas when the output current Ir becomes zero becomes lower (becomes richer).

In this regard, even if the air-fuel ratio of the exhaust gas is constant, variation occurs in the value of the output current of an air-fuel ratio sensor between individual air-fuel ratio sensors due to circuit error. Further, even in the same air-fuel ratio sensor, aging etc., causes variation in the value of the output current with respect to a predetermined air-fuel ratio of the exhaust gas. For this reason, error occurs in the air-fuel ratio of the exhaust gas calculated from the output current of an air-fuel ratio sensor.

On the other hand, when the output current of an air-fuel ratio sensor is zero, current does not flow to the electrical circuit, so the circuit error becomes extremely small. Further, in the nonactivated state of an air-fuel ratio sensor at the time of startup of the internal combustion engine etc., it is possible to learn the circuit error when the output current is zero and thereby further reduce the circuit error. For this reason, an air-fuel ratio sensor can precisely detect the air-fuel ratio corresponding to zero output current. For example, if setting the sensor applied voltage to 0.45V, an air-fuel ratio sensor can precisely detect that the air-fuel ratio of the exhaust gas is the stoichiometric air-fuel ratio.

Exhaust Purification System of Internal Combustion Engine

Below, an exhaust purification system of an internal combustion engine (below, simply referred to as an "exhaust purification system") according to a first embodiment of the present invention will be explained. The exhaust purification system is provided with an upstream side catalyst 20, downstream side catalyst 24, upstream side air-fuel ratio sensor 40, downstream side air-fuel ratio sensor 41, current detection device 61, voltage application device 60, voltage control part 71, and air-fuel ratio control part 72. In the present embodiment, the ECU 31 functions as the voltage control part 71 and the air-fuel ratio control part 72.

Figure 10:
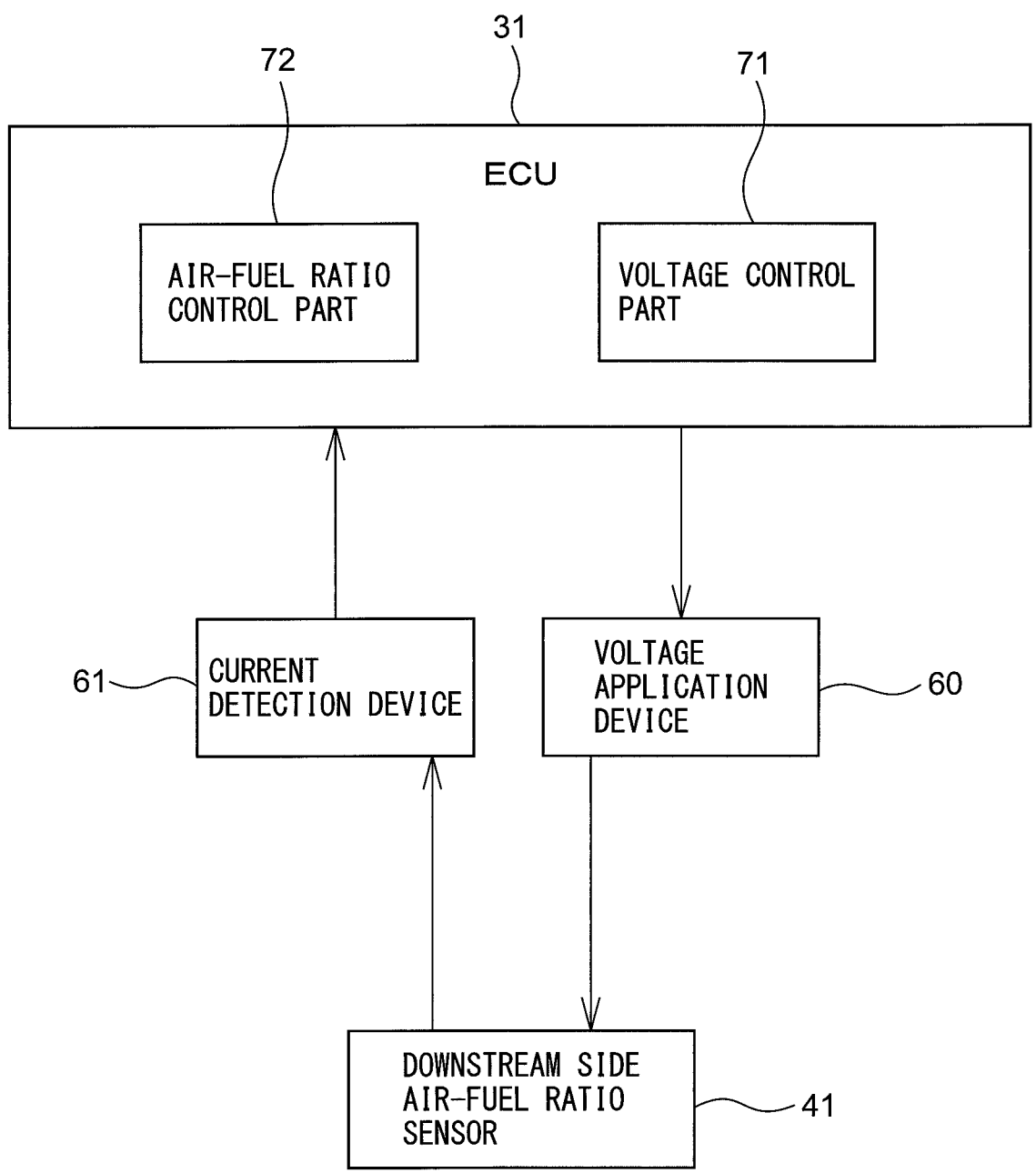
FIG. 10 is a block diagram showing a part of the exhaust purification system of an internal combustion engine according to the first embodiment of the present invention.

FIG. 10 is a block diagram showing a part of the exhaust purification system of an internal combustion engine according to the first embodiment of the present invention. The voltage control part 71 controls the voltage applied to the downstream side air-fuel ratio sensor 41 through the voltage application device 60. The air-fuel ratio control part 72 controls the air-fuel ratio of the exhaust gas flowing into the upstream side catalyst 20 (below, referred to as the "inflowing exhaust gas") so that the output current of the downstream side air-fuel ratio sensor 41 becomes the target value. The air-fuel ratio control part 72 changes the amount of fuel supplied to the combustion chambers 5 so as to control the air-fuel ratio of the inflowing exhaust gas.

The target value is determined in advance. In the present embodiment, it is zero. As explained above, when the output current is zero, the circuit error is small. For this reason, using the above-mentioned control, it is possible to precisely control the air-fuel ratio of the exhaust gas flowing out from the upstream side catalyst 20 (below, referred to as the "outflowing exhaust gas") to the air-fuel ratio corresponding to zero output current.

In this regard, in an internal combustion engine, sometimes even if control is performed to make the air-fuel ratio of the inflowing exhaust gas approach the target air-fuel ratio (for example the stoichiometric air-fuel ratio), external disturbance etc., causes the air-fuel ratio of the inflowing exhaust gas to greatly deviate from the target air-fuel ratio. For example, when the engine load rapidly rises at the time of acceleration of the vehicle etc., the amount of fuel injected from the fuel injectors 11 is increased. For this reason, sometimes the air-fuel ratio of the inflowing exhaust gas greatly deviates from the target air-fuel ratio to the rich side and the oxygen storage amount of the upstream side catalyst 20 becomes zero. In this case, a large amount of unburned gas flows out from the upstream side catalyst 20 and the rich degree of the air-fuel ratio of the outflowing exhaust gas detected by the downstream side air-fuel ratio sensor 41 becomes larger. Note that, the "rich degree of the air-fuel ratio" means the difference between an air-fuel ratio richer than the stoichiometric air-fuel ratio and the stoichiometric air-fuel ratio.

Further, the air-fuel ratio control part 72 performs fuel cut control stopping the supply of fuel to the combustion chambers 5 during operation of the internal combustion engine when predetermined execution conditions are satisfied. The air-fuel ratio control part 72, in fuel cut control, stops the injection of fuel from the fuel injectors 11 so as to stop the supply of fuel to the combustion chambers 5. The predetermined execution conditions are, for example, the amount of depression of the accelerator pedal 42 being zero or substantially zero (that is, the engine load being zero or substantially zero) and the engine speed being at least a predetermined speed higher than the speed at the time of idling.

If fuel cut control is performed, air or a gas similar to air is exhausted into the exhaust passage, so gas with an extremely high air-fuel ratio flows into the upstream side catalyst 20. For this reason, sometimes the air-fuel ratio of the inflowing exhaust gas greatly deviates from the target value to the lean side and the oxygen storage amount of the upstream side catalyst 20 reaches its maximum. In this case, a large amount of oxygen flows out from the upstream side catalyst 20 and the lean degree of the air-fuel ratio of the outflowing exhaust gas detected by the downstream side air-fuel ratio sensor 41 becomes larger. Note that, the "lean degree of the air-fuel ratio" means the difference between an air-fuel ratio leaner than the stoichiometric air-fuel ratio and the stoichiometric air-fuel ratio.

If external disturbance etc., causes the rich degree of the air-fuel ratio of the outflowing exhaust gas to become larger, to keep unburned gas from flowing out, it is necessary to make the air-fuel ratio of the inflowing exhaust gas leaner than the stoichiometric air-fuel ratio and make the air-fuel ratio of the outflowing exhaust gas approach the vicinity of the stoichiometric air-fuel ratio. However, if the target air-fuel ratio of the outflowing exhaust gas is set to the stoichiometric air-fuel ratio or leaner than the stoichiometric air-fuel ratio, due to control error, the lean degree of the air-fuel ratio of the outflowing exhaust gas is liable to become larger and a large amount of $NO_X$ is liable to flow out from the upstream side catalyst 20. This problem is remarkable in particular when aging etc., causes the maximum oxygen storage amount of the upstream side catalyst 20 to fall.

Further, when fuel cut control etc., causes the lean degree of the air-fuel ratio of the outflowing exhaust gas to become larger, to keep $NO_X$ from flowing out, the air-fuel ratio of the inflowing exhaust gas has to be made richer than the stoichiometric air-fuel ratio and the air-fuel ratio of the outflowing exhaust gas has to be made to approach the vicinity of the stoichiometric air-fuel ratio. However, if the target air-fuel ratio of the outflowing exhaust gas is set to the stoichiometric air-fuel ratio or richer than the stoichiometric air-fuel ratio, due to control error, the rich degree of the air-fuel ratio of the outflowing exhaust gas is liable to become larger and a large amount of unburned gas is liable to flow out from the upstream side catalyst 20. This problem is remarkable in particular when aging etc., causes the maximum oxygen storage amount of the upstream side catalyst 20 to fall.

Therefore, in the present embodiment, when the air-fuel ratio of the outflowing exhaust gas detected by the downstream side air-fuel ratio sensor 41 becomes higher than the lean judged air-fuel ratio leaner than the stoichiometric air-fuel ratio, the target air-fuel ratio of the outflowing exhaust gas is set to the slightly lean air-fuel ratio. The slightly lean air-fuel ratio is determined in advance and is set to a value slightly leaner than the stoichiometric air-fuel ratio. The lean degree of the slightly lean air-fuel ratio is extremely low, so when the air-fuel ratio of the outflowing exhaust gas is the slightly lean air-fuel ratio, almost no $NO_X$ flows out from the upstream side catalyst 20. The lean judged air-fuel ratio is determined in advance. In the present embodiment, it is equal to the slightly lean air-fuel ratio. Note that, the lean judged air-fuel ratio may be an air-fuel ratio leaner than the slightly lean air-fuel ratio.

Further, in the present embodiment, when the air-fuel ratio of the outflowing exhaust gas detected by the downstream side air-fuel ratio sensor 41 becomes lower than the rich judged air-fuel ratio richer than the stoichiometric air-fuel ratio, the target air-fuel ratio of the outflowing exhaust gas is set to the slightly rich air-fuel ratio. The slightly rich air-fuel ratio is determined in advance and is set to a value slightly lower than the stoichiometric air-fuel ratio. The rich degree of the slightly rich air-fuel ratio is extremely low, so when the air-fuel ratio of the outflowing exhaust gas is the slightly rich air-fuel ratio, almost no unburned gas flows out from the upstream side catalyst 20. The rich judged air-fuel ratio is determined in advance. In the present embodiment, it is equal to the slightly rich air-fuel ratio. Note that, the rich judged air-fuel ratio may be an air-fuel ratio richer than the slightly rich air-fuel ratio.

As explained above, the air-fuel ratio control part 72 controls the air-fuel ratio of the inflowing exhaust gas so that the output current of the downstream side air-fuel ratio sensor 41 becomes zero. For this reason, the air-fuel ratio of the outflowing exhaust gas approaches the air-fuel ratio corresponding to zero output current. Further, the air-fuel ratio corresponding to zero output current fluctuates in accordance with the voltage applied to the downstream side air-fuel ratio sensor 41. Specifically, as will be understood from FIG. 7 and FIG. 8, if lowering the voltage applied to the downstream side air-fuel ratio sensor 41, the air-fuel ratio corresponding to zero output current becomes lean, while if raising the voltage applied to the downstream side air-fuel ratio sensor 41, the air-fuel ratio corresponding to zero output current becomes rich. For this reason, in the present embodiment, the voltage applied to the downstream side air-fuel ratio sensor 41 is changed to change the target air-fuel ratio of the outflowing exhaust gas.

Specifically, the voltage control part 71 performs voltage lowering control setting the voltage applied to the downstream side air-fuel ratio sensor 41 to a first voltage lower than the reference voltage when the air-fuel ratio of the outflowing exhaust gas detected by the downstream side air-fuel ratio sensor 41 becomes higher than the lean judged air-fuel ratio. The reference voltage is the voltage at which the output current of the downstream side air-fuel ratio sensor 41 becomes zero when the air-fuel ratio of the outflowing exhaust gas is the stoichiometric air-fuel ratio and, in the present embodiment, is 0.45V. The first voltage is the voltage at which the output current of the downstream side air-fuel ratio sensor 41 becomes zero when the air-fuel ratio of the outflowing exhaust gas is the slightly lean air-fuel ratio. The first voltage is for example set to 0.15V to 0.44V. This voltage region is within the limit current region. By setting the first voltage to a value within the limit current region, it is possible to suppress fluctuation of the air-fuel ratio when the output current becomes zero. In the present embodiment, the first voltage is set to 0.3V. Due to this, the lean degree of the slightly lean air-fuel ratio can be kept from becoming excessively high.

According to the above-mentioned voltage lowering control, it is possible to keep the rich degree of the air-fuel ratio of the outflowing exhaust gas from becoming larger due to control error when making the air-fuel ratio of the outflowing exhaust gas approach the stoichiometric air-fuel ratio from the lean side. Therefore, due to voltage lowering control, it is possible to keep a large amount of unburned gas from flowing out from the upstream side catalyst 20 and in turn keep the exhaust emission from deteriorating.

Further, the voltage control part 71 performs voltage raising control setting the voltage applied to the downstream side air-fuel ratio sensor 41 to a second voltage higher than the reference voltage when the air-fuel ratio of the outflowing exhaust gas detected by the downstream side air-fuel ratio sensor 41 becomes lower than the rich judged air-fuel ratio. The second voltage is the voltage at which the output current of the downstream side air-fuel ratio sensor 41 becomes zero when the air-fuel ratio of the outflowing exhaust gas is the slightly rich air-fuel ratio. The second voltage is for example set to 0.46V to 0.7V. This voltage region is within the limit current region. By setting the second voltage to a value within the limit current region, it is possible to suppress fluctuation of the air-fuel ratio when the output current becomes zero. In the present embodiment, the second voltage is set to 0.6V. Due to this, the rich degree of the slightly rich air-fuel ratio can be kept from becoming excessively high. Further, in the present embodiment, the difference between the first voltage and the reference voltage is equal to the difference between the second voltage and the reference voltage. In other words, the lean degree of the slightly lean air-fuel ratio is equal to the rich degree of the slightly rich air-fuel ratio.

According to the above-mentioned voltage raising control, it is possible to keep the lean degree of the air-fuel ratio of the outflowing exhaust gas from becoming larger due to control error when making the air-fuel ratio of the outflowing exhaust gas approach the stoichiometric air-fuel ratio from the rich side. Therefore, due to voltage raising control, it is possible to keep a large amount of $NO_X$ from flowing out from the upstream side catalyst 20 and in turn keep the exhaust emission from deteriorating.

Explanation of Control Using Time Chart

Figure 11:
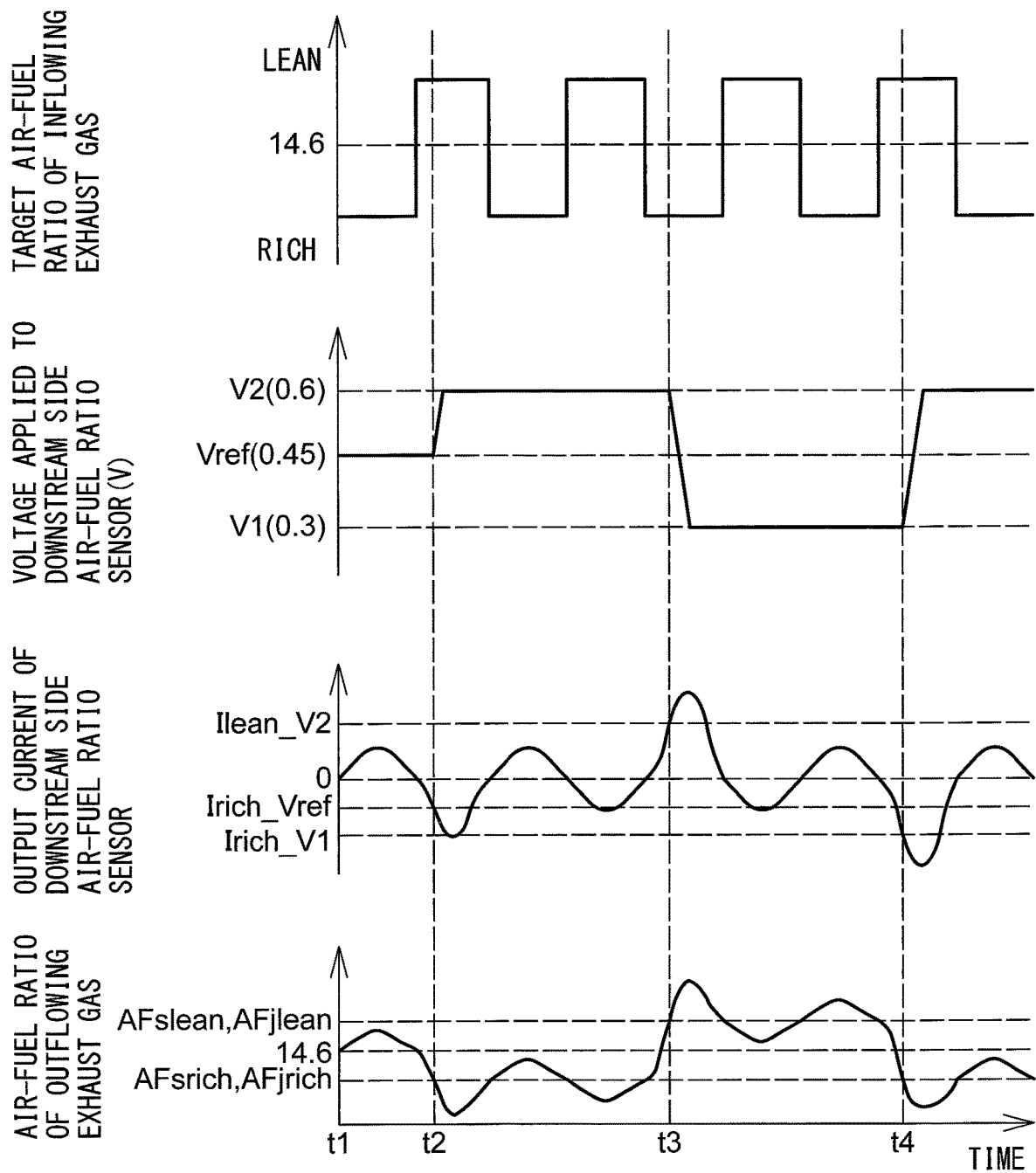
FIG. 11 is a time chart of a target air-fuel ratio of the inflowing exhaust gas etc., when voltage lowering control and voltage raising control are performed.

Below, referring to FIG. 11, voltage lowering control and voltage raising control will be specifically explained. FIG. 11 is a time chart of the target air-fuel ratio of the inflowing exhaust gas, the voltage applied to the downstream side air-fuel ratio sensor 41, the output current of the downstream side air-fuel ratio sensor 41, and the air-fuel ratio of the outflowing exhaust gas detected by the downstream side air-fuel ratio sensor 41 when voltage lowering control and voltage raising control are performed.

As explained above, in the present embodiment, the air-fuel ratio of the inflowing exhaust gas is controlled so that the output current of the downstream side air-fuel ratio sensor 41 becomes zero. For this reason, in the time chart of FIG. 11, when the output current of the downstream side air-fuel ratio sensor 41 is larger than zero, the target air-fuel ratio of the inflowing exhaust gas is made richer than the stoichiometric air-fuel ratio, while when the output current of the downstream side air-fuel ratio sensor 41 is smaller than zero, the target air-fuel ratio of the inflowing exhaust gas is made leaner than the stoichiometric air-fuel ratio.

In the example of FIG. 11, at the time t1 after the internal combustion engine starts up, the voltage applied to the downstream side air-fuel ratio sensor 41 is set to 0.45V (reference voltage Vref). Therefore, the target air-fuel ratio of the outflowing exhaust gas is set to the stoichiometric air-fuel ratio (14.6).

After that, at the time t2, due to external disturbance etc., and consequent disabled control, the output current of the downstream side air-fuel ratio sensor 41 becomes smaller than the rich side switching judgment value Irich_Vref. As will be understood from FIG. 8, the rich side switching judgment value Irich_Vref is the value of the output current corresponding to the rich judged air-fuel ratio AFjrich when the voltage applied to the downstream side air-fuel ratio sensor 41 is the reference voltage Vref. Therefore, at the time t2, the air-fuel ratio of the outflowing exhaust gas detected by the downstream side air-fuel ratio sensor 41 becomes lower than the rich judged air-fuel ratio AFjrich.

At the time t2, the voltage applied to the downstream side air-fuel ratio sensor 41 is set to the second voltage (0.6V). That is, the voltage applied to the downstream side air-fuel ratio sensor 41 is switched from the reference voltage to the second voltage. Therefore, the target air-fuel ratio of the outflowing exhaust gas is switched from the stoichiometric air-fuel ratio to the slightly rich air-fuel ratio AFsrich.

If the voltage applied to the downstream side air-fuel ratio sensor 41 is switched from the reference voltage to the second voltage, the air-fuel ratio of the outflowing exhaust gas changes toward the slightly rich air-fuel ratio AFsrich. The air-fuel ratio of the outflowing exhaust gas temporarily becomes leaner than the slightly rich air-fuel ratio AFsrich due to overshooting. However, the air-fuel ratio of the outflowing exhaust gas will not become leaner than the stoichiometric air-fuel ratio.

After that, at the time t3, due to external disturbance etc., and consequent disabled control, the output current of the downstream side air-fuel ratio sensor 41 becomes larger than the lean side switching judgment value Ilean_V2. As will be understood from FIG. 8, the lean side switching judgment value Ilean_V2 is the value of the output current corresponding to the lean judged air-fuel ratio AFjlean when the voltage applied to the downstream side air-fuel ratio sensor 41 is the second voltage V2. Therefore, at the time t3, the air-fuel ratio of the outflowing exhaust gas detected by the downstream side air-fuel ratio sensor 41 becomes higher than the lean judged air-fuel ratio AFjlean.

At the time t3, the voltage applied to the downstream side air-fuel ratio sensor 41 is set to the first voltage (0.3V). That is, the voltage applied to the downstream side air-fuel ratio sensor 41 is switched from the second voltage to the first voltage. Therefore, the target air-fuel ratio of the outflowing exhaust gas is switched from the slightly rich air-fuel ratio AFsrich to the slightly lean air-fuel ratio AFslean.

If the voltage applied to the downstream side air-fuel ratio sensor 41 is switched from the second voltage and to the first voltage, the air-fuel ratio of the outflowing exhaust gas changes toward the slightly lean air-fuel ratio AFslean. The air-fuel ratio of the outflowing exhaust gas temporarily becomes richer than the slightly lean air-fuel ratio AFsrich due to overshooting. However, the air-fuel ratio of the outflowing exhaust gas will not become richer than the stoichiometric air-fuel ratio.

After that, at the time t4, due to external disturbance etc., and consequent disabled control, the output current of the downstream side air-fuel ratio sensor 41 becomes smaller than the rich side switching judgment value Irick_V1. As will be understood from FIG. 8, the rich side switching judgment value Irich_V1 is the value of the output current corresponding to the rich judged air-fuel ratio AFjrich when the voltage applied to the downstream side air-fuel ratio sensor 41 is the first voltage V1. Therefore, at the time t4, the air-fuel ratio of the outflowing exhaust gas detected by the downstream side air-fuel ratio sensor 41 becomes lower than the rich judged air-fuel ratio AFjrich.

At the time t4, the voltage applied to the downstream side air-fuel ratio sensor 41 is set to the second voltage (0.6V). That is, the voltage applied to the downstream side air-fuel ratio sensor 41 is switched from the first voltage to the second voltage. Therefore, the target air-fuel ratio of the outflowing exhaust gas is switched from the slightly lean air-fuel ratio AFslean to the slightly rich air-fuel ratio AFsrich.

In the example of FIG. 11, when, after the time t2, the air-fuel ratio of the outflowing exhaust gas is made to approach the stoichiometric air-fuel ratio from the rich side, the air-fuel ratio of the outflowing exhaust gas will not reach the stoichiometric air-fuel ratio. However, so long as the lean degree of the air-fuel ratio of the outflowing exhaust gas can be kept from becoming larger, the air-fuel ratio of the outflowing exhaust gas may temporarily become leaner than the stoichiometric air-fuel ratio. Further, in the example of FIG. 11, when, after the time t3, the air-fuel ratio of the outflowing exhaust gas is made to approach the stoichiometric air-fuel ratio from the lean side, the air-fuel ratio of the outflowing exhaust gas will not reach the stoichiometric air-fuel ratio. However, so long as the rich degree of the air-fuel ratio of the outflowing exhaust gas can be kept from becoming larger, the air-fuel ratio of the outflowing exhaust gas may also be temporarily made richer than the stoichiometric air-fuel ratio.

Voltage Switching Control

Figure 12:
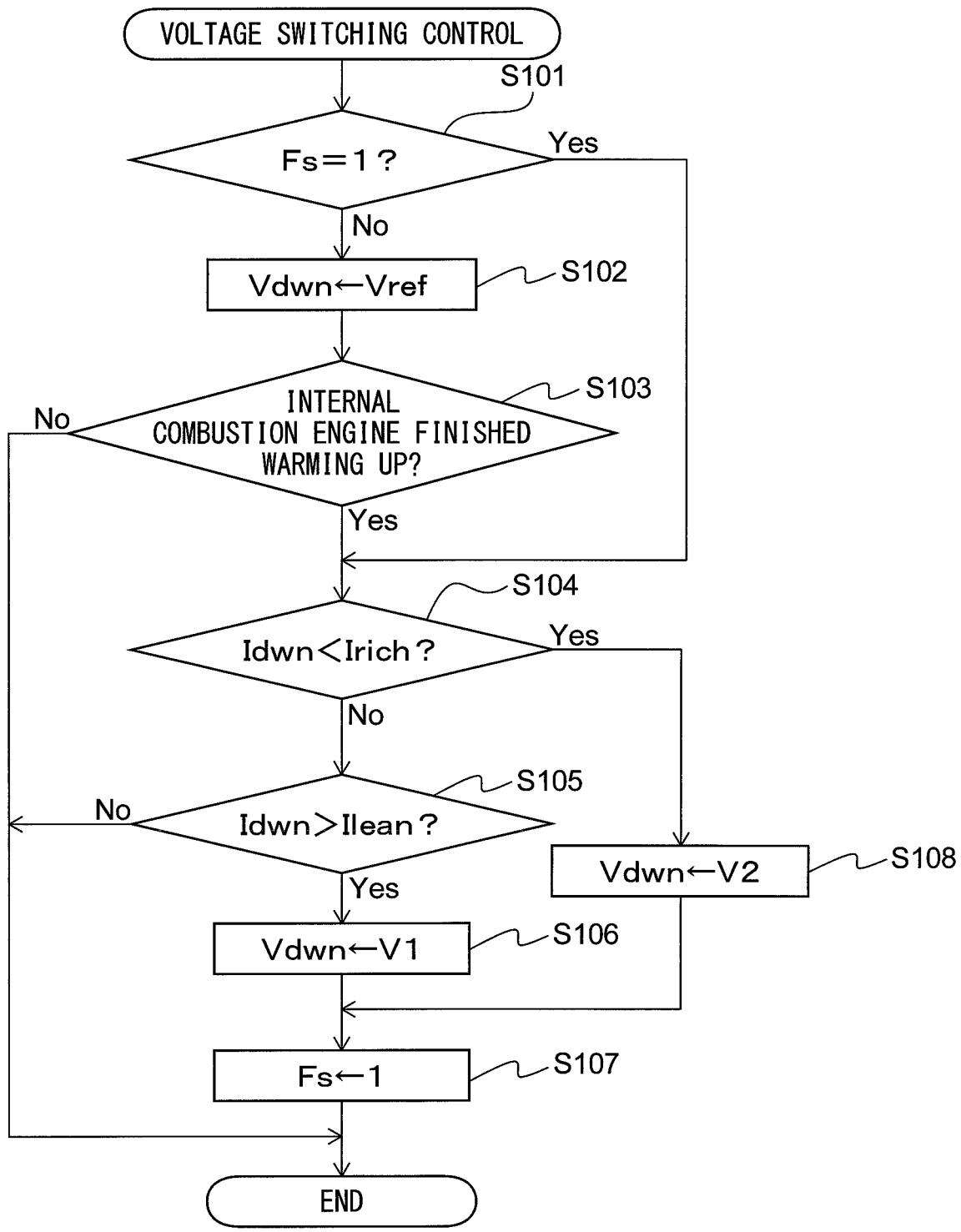
FIG. 12 is a flow chart showing a control routine of voltage switching control in the first embodiment of the present invention.

Below, referring to the flow chart of FIG. 12, voltage switching control for switching the voltage applied to the downstream side air-fuel ratio sensor 41 in the present embodiment will be explained. FIG. 12 is a flow chart showing the control routine of voltage switching control in the first embodiment of the present invention. The present control routine is executed by the ECU 31 at predetermined time intervals after the internal combustion engine starts up.

First, at step 5101, the voltage control part 71 judges whether a switching execution flag Fs is "1". The switching execution flag Fs is set to "1" when the voltage applied to the downstream side air-fuel ratio sensor 41 is set to the first voltage V1 or the second voltage V2 and is reset and made zero when the internal combustion engine is stopped. Further, the initial value of the switching execution flag Fs is zero.

If at step S101 it is judged that the switching execution flag Fs is zero, the present control routine proceeds to step S102. At step S102, the voltage control part 71 sets the voltage Vdwn applied to the downstream side air-fuel ratio sensor 41 to the reference voltage Vref. The reference voltage Vref is the voltage at which the output current of the downstream side air-fuel ratio sensor 41 becomes zero when the air-fuel ratio of the outflowing exhaust gas is the stoichiometric air-fuel ratio and is, for example, 0.45V.

Next, at step S103, the voltage control part 71 judges whether the internal combustion engine has finished warming up. The voltage control part 71 judges that the internal combustion engine has finished warming up for example when the engine water temperature is a predetermined temperature or more and judges that the internal combustion engine has not finished warming up when the engine water temperature is less than the predetermined temperature. If at step S103 it is judged that internal combustion engine has not finished warming up, the present control routine ends.

On the other hand, if at step S103 it is judged that the internal combustion engine has finished warming up, the present control routine proceeds to step S104. At step S104, the voltage control part 71 judges whether the output current Idwn of the downstream side air-fuel ratio sensor 41 is lower than the rich side switching judgment value Irich. The output current Idwn is detected by the current detection device 61. The rich side switching judgment value Irich is the value of the output current corresponding to the rich judged air-fuel ratio. Therefore, at step S104, the voltage control part 71 judges whether the air-fuel ratio of the outflowing exhaust gas detected by the downstream side air-fuel ratio sensor 41 is lower than the rich judged air-fuel ratio.

Note that, the rich side switching judgment value Irich is determined based on the current applied voltage Vdwn. As shown in FIG. 8, the rich side switching judgment value Irich_Vref when the applied voltage Vdwn is the reference voltage Vref (0.45V) is higher than the rich side switching judgment value Irich_V1 when the applied voltage Vdwn is the first voltage (0.3V).

If at step S104 it is judged that the output current Idwn of the downstream side air-fuel ratio sensor 41 is the rich side switching judgment value Irich or more, the present control routine proceeds to step S105. At step S105, the voltage control part 71 judges whether the output current Idwn of the downstream side air-fuel ratio sensor 41 is higher than the lean side switching judgment value Ilean. The lean side switching judgment value Ilean is the value of the output current corresponding to the lean judged air-fuel ratio. Therefore, at step S105, the voltage control part 71 judges whether the air-fuel ratio of the outflowing exhaust gas detected by the downstream side air-fuel ratio sensor 41 has become higher than the lean judged air-fuel ratio.

Note that, the lean side switching judgment value Ilean is determined based on the current applied voltage Vdwn. As shown in FIG. 8, the lean side switching judgment value Ilean_Vref when the applied voltage Vdwn is the reference voltage Vref (0.45V) is lower than the lean side switching judgment value Ilean_V2 when the applied voltage Vdwn is the second voltage (0.6V).

If at step S105 it is judged that the output current Idwn of the downstream side air-fuel ratio sensor 41 is the lean side switching judgment value Ilean or less, the present control routine ends.

On the other hand, if at step S104 it is judged that the output current Idwn of the downstream side air-fuel ratio sensor 41 is lower than the rich side switching judgment value Irich, the present control routine proceeds to step S108. At step S108, the voltage control part 71 sets the applied voltage Vdwn to the second voltage V2. That is, the target air-fuel ratio of the outflowing exhaust gas is set to the slightly rich air-fuel ratio. The second voltage V2 is higher than the reference voltage, for example, is 0.6V.

Further, if at step S105 it is judged that the output current Idwn of the downstream side air-fuel ratio sensor 41 is higher than the lean side switching judgment value Ilean, the present control routine proceeds to step S106. At step S106, the voltage control part 71 sets the applied voltage Vdwn to the first voltage V1. That is, the target air-fuel ratio of the outflowing exhaust gas is set to a slightly lean air-fuel ratio. The first voltage V1 is lower than the reference voltage, for example, is 0.3V.

After step S108 or step S106, the present control routine proceeds to step S107. At step S107, the voltage control part 71 sets the switching execution flag Fs to "1". After step S107, the present control routine ends.

Further, if at step S101 it is judged that the switching execution flag Fs is "1", the present control routine skips step S102 and step S103 and proceeds to step S104.

Note that, if due to fuel cut control, the output current Idwn of the downstream side air-fuel ratio sensor 41 becomes higher than the lean side switching judgment value Ilean, the applied voltage Vdwn may be set to the first voltage V1 at the time of end of fuel cut control. Further, step S104 and step S108 or step S105 and step S106 may be omitted. That is, only one of the voltage raising control and voltage lowering control may be performed. Further, the applied voltage Vdwn to the downstream side air-fuel ratio sensor 41 may be temporarily set to the reference voltage Vref even after the applied voltage to the downstream side air-fuel ratio sensor 41 is set to the first voltage V1 or the second voltage V2.

Air-Fuel Ratio Control

Below, referring to the flow chart of FIG. 13, the air-fuel ratio control in the present embodiment will be explained.

Figure 13:
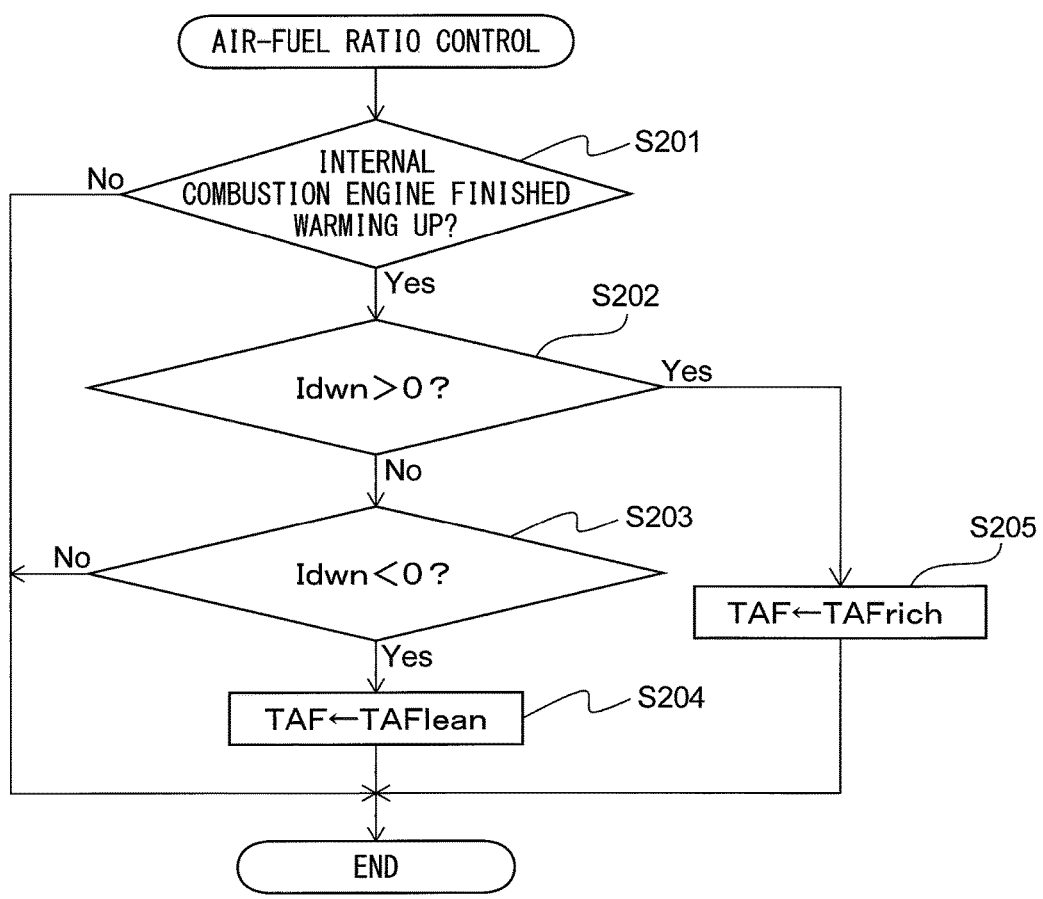
FIG. 13 is a flow chart showing air-fuel ratio control in the first embodiment of the present invention.

FIG. 13 is a flow chart showing air-fuel ratio control in the first embodiment of the present invention. The present control routine is executed by the ECU 31 at predetermined time intervals after the internal combustion engine starts up. The air-fuel ratio control part 72 controls the air-fuel ratio of the inflowing exhaust gas so that the output current Idwn of the downstream side air-fuel ratio sensor 41 becomes zero.

First, at step S201, the air-fuel ratio control part 72, in the same way as step S103 of FIG. 12, judges whether the internal combustion engine has finished warming up. If it is judged that the internal combustion engine has not finished warming up, the present control routine ends. On the other hand, if it is judged that the internal combustion engine has finished warming up, the present control routine proceeds to step S202.

At step S202, the air-fuel ratio control part 72 judges whether the output current Idwn of the downstream side air-fuel ratio sensor 41 is greater than zero. The output current Idwn is detected by the current detection device 61. If at step S202 it is judged that the output current Idwn of the downstream side air-fuel ratio sensor 41 is zero or less, the present control routine proceeds to step S203.

At step S203, the air-fuel ratio control part 72 judges whether the output current Idwn of the downstream side air-fuel ratio sensor 41 is smaller than zero. If it is judged that the output current Idwn of the downstream side air-fuel ratio sensor 41 is zero or more, that is, when the output current Idwn is zero, the present control routine ends.

On the other hand, if at step S202 it is judged that the output current Idwn of the downstream side air-fuel ratio sensor 41 is larger than zero, the present control routine proceeds to step S205. At step S205, the air-fuel ratio control part 72 sets the target air-fuel ratio TAF of the inflowing exhaust gas to the rich air-fuel ratio TAFrich richer than the stoichiometric air-fuel ratio. Specifically, the air-fuel ratio control part 72 sets the rich air-fuel ratio TAFrich based on the difference between the output current Idwn of the downstream side air-fuel ratio sensor 41 and zero and corrects the amount of fuel injected from the fuel injectors 11. After step S205, the present control routine ends.

Further, if at step S203 it is judged that the output current Idwn of the downstream side air-fuel ratio sensor 41 is smaller than zero, the present control routine proceeds to step S204. At step S204, the air-fuel ratio control part 72 sets the target air-fuel ratio TAF of the inflowing exhaust gas to the lean air-fuel ratio TAFlean leaner than the stoichiometric air-fuel ratio. Specifically, the air-fuel ratio control part 72 sets the lean air-fuel ratio TAFlean based on the difference between the output current Idwn of the downstream side air-fuel ratio sensor 41 and zero and corrects the amount of fuel injected from the fuel injectors 11. After step S204, the present control routine ends.

Second Embodiment

The exhaust purification system of an internal combustion engine according to the second embodiment is basically similar in configuration and control with the exhaust purification system of an internal combustion engine according to the first embodiment except for the points explained below. For this reason, below, the second embodiment of the present invention will be explained focusing on the parts different from the first embodiment.

Figure 14:
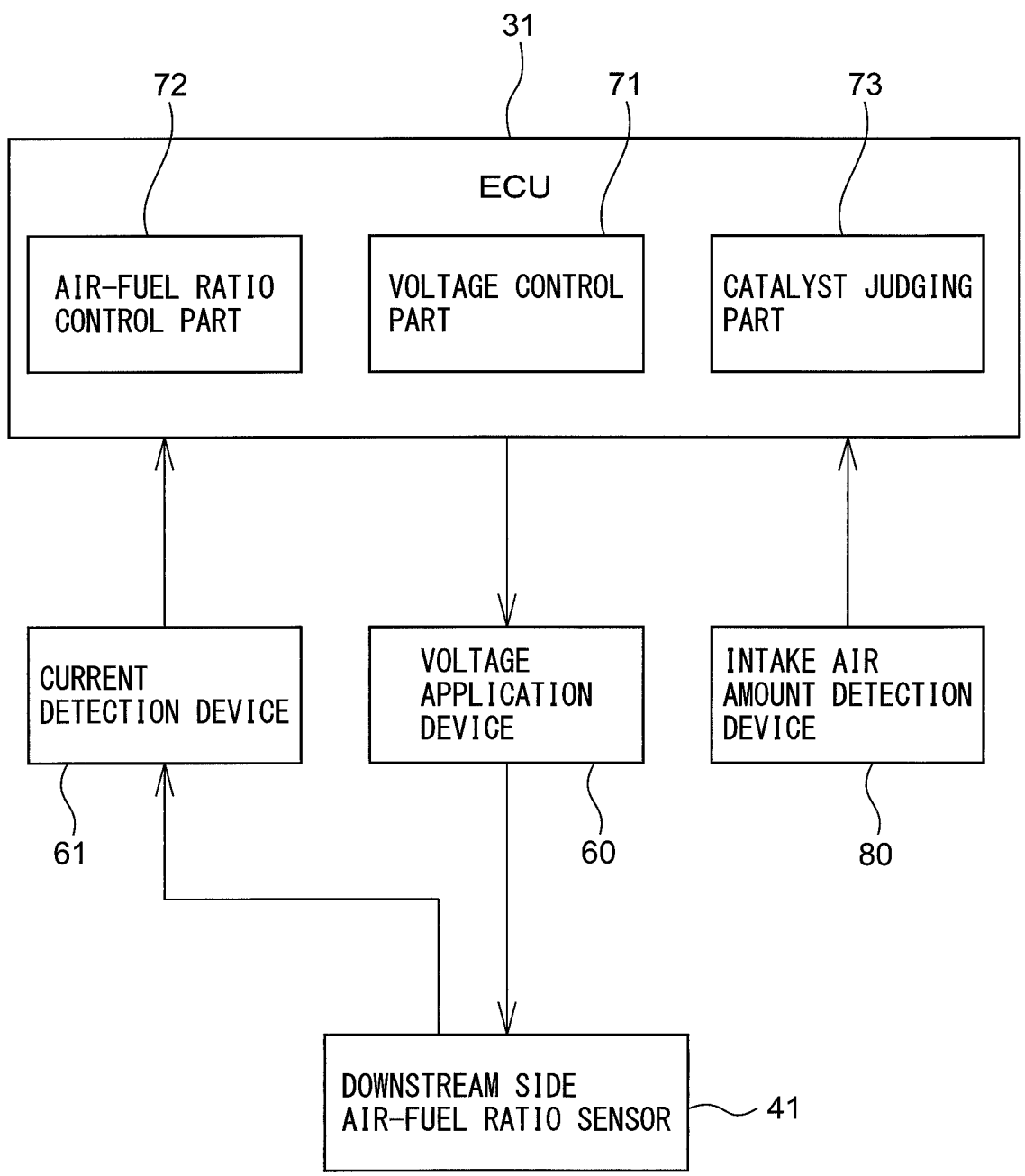
FIG. 14 is a block diagram showing a part of the exhaust purification system of an internal combustion engine according to a second embodiment of the present invention.

FIG. 14 is a block diagram showing part of the exhaust purification system of an internal combustion engine of the second embodiment of the present invention. The exhaust purification system is further provided with an intake air amount detection device 80 detecting the intake air amount. The intake air amount detection device 80 is for example an air flowmeter 39.

If the intake air amount is large, the amount of exhaust gas also increases and the gas reaction time at the upstream side catalyst 20 decreases. For this reason, a large amount of unburned gas is liable to flow out before the air-fuel ratio of the outflowing exhaust gas reaches the stoichiometric air-fuel ratio from the lean side. Further, a large amount of $NO_X$ is liable to flow out before the air-fuel ratio of the outflowing exhaust gas reaches the stoichiometric air-fuel ratio from the rich side.

For this reason, in the second embodiment, the target air-fuel ratio of the outflowing exhaust gas set when the air-fuel ratio of the outflowing exhaust gas became higher than the lean judged air-fuel ratio, that is, the slightly lean air-fuel ratio, is made leaner the greater the intake air amount. As will be understood from FIG. 7 and FIG. 8, if lowering the voltage applied to the downstream side air-fuel ratio sensor 41, the air-fuel ratio corresponding to zero output current becomes leaner. For this reason, the voltage control part 71 lowers the first voltage the greater the intake air amount. Due to this, it becomes possible to set a target air-fuel ratio according to the intake air amount. Even if the intake air amount is large, it is possible to keep a large amount of unburned gas from flowing out from the upstream side catalyst 20. Therefore, it is possible to suppress deterioration of the exhaust emission much more. Note that, in the second embodiment, the first voltage is changed in the range of 0.15V to 0.44V in accordance with the intake air amount.

Further, in the second embodiment, the target air-fuel ratio of the outflowing exhaust gas set when the air-fuel ratio of the outflowing exhaust gas became lower than the rich judged air-fuel ratio, that is, the slightly rich air-fuel ratio, is made richer the greater the intake air amount. As will be understood from FIG. 7 and FIG. 8, if raising the voltage applied to the downstream side air-fuel ratio sensor 41, the air-fuel ratio corresponding to zero output current becomes rich. For this reason, the voltage control part 71 raises the second voltage the greater the intake air amount. Due to this, it becomes possible to set a target air-fuel ratio according to the intake air amount. Even if the intake air amount is large, it is possible to keep a large amount of $NO_X$ from flowing out from the upstream side catalyst 20. Therefore, it is possible to suppress deterioration of the exhaust emission much more. Note that, in the second embodiment, the second voltage is changed within a range of 0.46V to 0.7V in accordance with the intake air amount.

As shown in FIG. 14, the exhaust purification system is further provided with a catalyst judging part 73 judging the degree of deterioration of the upstream side catalyst 20. In the present embodiment, the ECU 31 functions as the catalyst judging part 73. The catalyst judging part 73 uses a known means to judge the degree of deterioration of the upstream side catalyst 20. For example, the catalyst judging part 73, as described in Japanese Patent Publication No. 2016-169664A etc., uses the upstream side air-fuel ratio sensor 40 and the downstream side air-fuel ratio sensor 41 to calculate the maximum oxygen storage amount of the upstream side catalyst 20 and judges the degree of deterioration of the upstream side catalyst 20 to be greater the smaller the maximum oxygen storage amount.

If the degree of deterioration of the upstream side catalyst 20 is large, the gas reactivity at the upstream side catalyst 20 falls. For this reason, before the air-fuel ratio of the outflowing exhaust gas reaches the stoichiometric air-fuel ratio from the lean side, a large amount of unburned gas is liable to flow out. Further, before the air-fuel ratio of the outflowing exhaust gas reaches the stoichiometric air-fuel ratio from the rich side, a large amount of $NO_X$ is liable to flow out.

For this reason, in the second embodiment, the target air-fuel ratio of the outflowing exhaust gas set when the air-fuel ratio of the outflowing exhaust gas becomes higher than the lean judged air-fuel ratio, that is, the slightly lean air-fuel ratio, is made leaner the larger the degree of deterioration of the upstream side catalyst 20. Therefore, the voltage control part 71 lowers the first voltage the greater the degree of deterioration of the upstream side catalyst 20. Due to this, it becomes possible to set a target air-fuel ratio according to the degree of deterioration of the upstream side catalyst 20. Even if the degree of deterioration of the upstream side catalyst 20 is large, it is possible to keep a large amount of unburned gas from flowing out from the upstream side catalyst 20. Therefore, it is possible to suppress deterioration of the exhaust emission much more. Note that, in the second embodiment, the first voltage is changed within the range of 0.15V to 0.44V in accordance with the degree of deterioration of the upstream side catalyst 20.

Further, in the second embodiment, the target air-fuel ratio of the outflowing exhaust gas set when the air-fuel ratio of the outflowing exhaust gas becomes lower than the rich judged air-fuel ratio, that is, the slightly rich air-fuel ratio, is made richer the larger the degree of deterioration of the upstream side catalyst 20. Therefore, the voltage control part 71 raises the second voltage the greater the degree of deterioration of the upstream side catalyst 20. Due to this, it becomes possible to set a target air-fuel ratio according to the degree of deterioration of the upstream side catalyst 20. Even if the degree of deterioration of the upstream side catalyst 20 is large, it is possible to keep a large amount of $NO_X$ from flowing out from the upstream side catalyst 20. Therefore, it is possible to suppress deterioration of the exhaust emission much more. Note that, in the second embodiment, the second voltage is changed within the range of 0.46V to 0.7V in accordance with the degree of deterioration of the upstream side catalyst 20.

Voltage Setting Control

Figure 15:
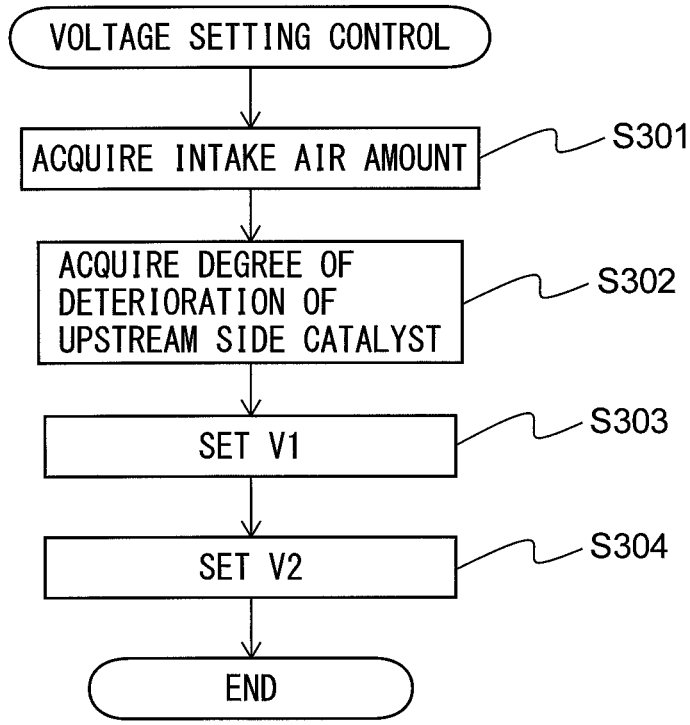
FIG. 15 is a flow chart showing the control routine of voltage setting control in the second embodiment of the present invention.

Below, referring to the flow chart of FIG. 15, voltage setting control for setting the first voltage and the second voltage in the present embodiment will be explained. In the second embodiment, the voltage setting control of FIG. 15 is performed in addition to the voltage setting control of FIG. 12 and the air-fuel ratio control of FIG. 13. FIG. 15 is a flow chart showing the control routine of voltage setting control in the second embodiment of the present invention. The present control routine is executed by the ECU 31 at predetermined time intervals after the internal combustion engine starts up.

First, at step S301, the voltage control part 71 acquires the intake air amount. The intake air amount is detected by the intake air amount detection device 80. Next, at step S302, the voltage control part 71 acquires the degree of deterioration of the upstream side catalyst 20. The degree of deterioration of the upstream side catalyst 20 is judged by the catalyst judging part 73.

Figure 16:
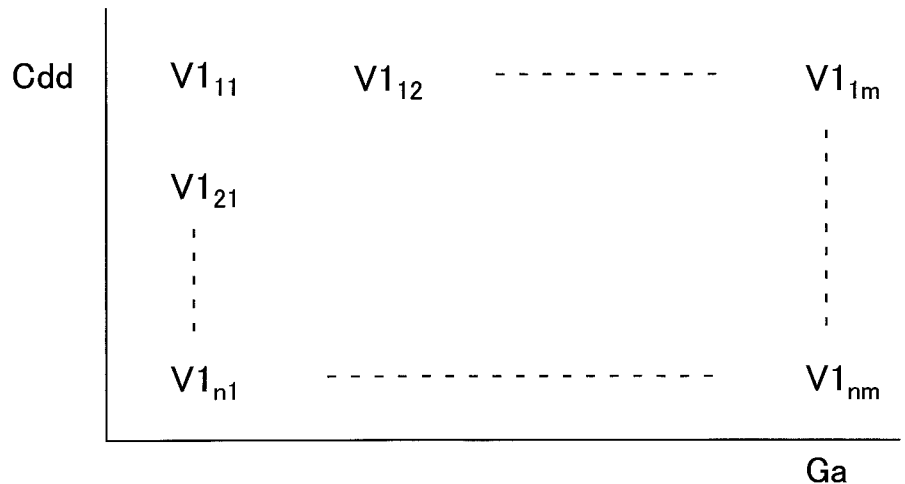
FIG. 16 is a map for setting the first voltage based on the intake air amount and the degree of deterioration of the upstream side catalyst.

Next, at step S303, the voltage control part 71 sets the first voltage V1 based on the intake air amount and the degree of deterioration of the upstream side catalyst 20. Specifically, the voltage control part 71 uses a map such as shown in FIG. 16 to set the first voltage V1. In the map of FIG. 16, the first voltage V1 is shown as a function of the intake air amount Ga and the degree of deterioration Cdd of the upstream side catalyst 20. This map is prepared so that when the degree of deterioration Cdd is constant, the greater the intake air amount Ga, the lower the first voltage V1 becomes. Further, this map is prepared so that when the intake air amount Ga is constant, the greater the degree of deterioration Cdd, the lower the first voltage V1 becomes.

Figure 17:
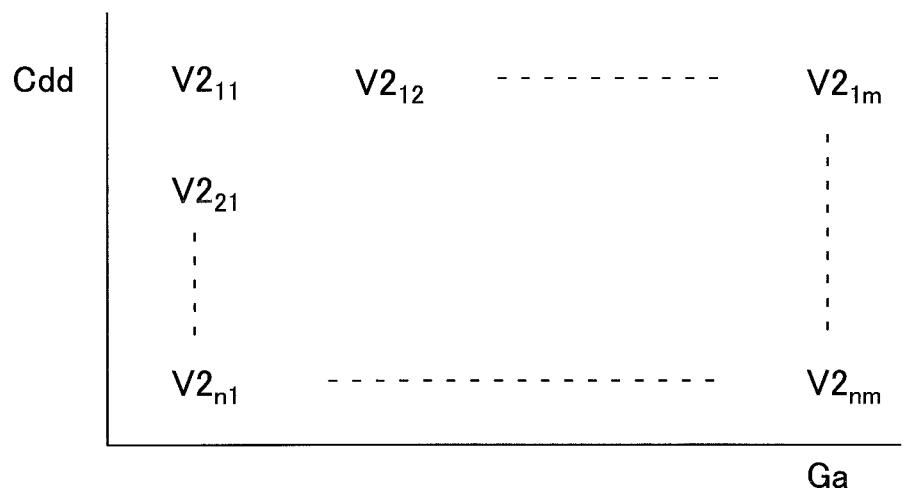
FIG. 17 is a map for setting the second voltage based on the intake air amount and the degree of deterioration of the upstream side catalyst.

Next, at step S304, the voltage control part 71 sets the second voltage V2 based on the intake air amount and the degree of deterioration of the upstream side catalyst 20. Specifically, the voltage control part 71 uses a map such as shown in FIG. 17 to set the second voltage V2. In the map of FIG. 17, the second voltage V2 is shown as a function of the intake air amount Ga and the degree of deterioration Cdd of the upstream side catalyst 20. This map is prepared so that when the degree of deterioration Cdd is constant, the larger the intake air amount Ga, the higher the second voltage V1 becomes. Further, this map is prepared so that when the intake air amount Ga is constant, the greater the degree of deterioration Cdd, the higher the second voltage V2 becomes.

After step S304, the present control routine ends. The first voltage V1 set at step S303 is used at step S106 of FIG. 12. The second voltage V2 set at step S304 is used at step S108 of FIG. 12.

Note that, step S301 or step S302 may be omitted. If step S301 is omitted, the voltage control part 71 sets the first voltage V1 and the second voltage V2 based on the degree of deterioration of the upstream side catalyst 20 and lowers the first voltage and raises the second voltage the larger the degree of deterioration. If step S302 is omitted, the voltage control part 71 sets the first voltage V1 and the second voltage V2 based on the intake air amount and lowers the first voltage and raises the second voltage the larger the intake air amount.

Further, the exhaust purification system may be provided with an intake air amount estimating part estimating the intake air instead of the intake air amount detection device 80. In this case, the ECU 31 functions as the intake air amount estimating part. The intake air amount estimating part, for example, uses model calculations such as described in Japanese Patent Publication No. 2013-133793A to estimate the intake air amount.

Above, preferred embodiments according to the present invention were explained, but the present invention is not limited to these embodiments and may be corrected and changed in various ways within the language of the claims. In the above embodiments, the air-fuel ratio is basically controlled based on the output of the downstream side air-fuel ratio sensor 41. Further, the harmful substances in exhaust gas are basically removed at the upstream side catalyst 20. For this reason, the exhaust purification system need not be provided with the upstream side air-fuel ratio sensor 40 and the downstream side catalyst 24.

Further, even if the output current of the downstream side air-fuel ratio sensor 41 is zero, sometimes slight error arises in the downstream side air-fuel ratio sensor 41 and the electrical circuit 70, so considering such error, the target value of the output current of the downstream side air-fuel ratio sensor 41 may be set to a value slightly higher than zero or to a value slightly lower than zero.

REFERENCE SIGNS LIST 20. upstream side catalyst
22. exhaust pipe
31. electronic control unit (ECU)

41. downstream side air-fuel ratio sensor
60. voltage application device
61. current detection device
71. voltage control part
72. air-fuel ratio control part

The invention claimed is:

1. An exhaust purification system of an internal combustion engine comprising:
   a catalyst arranged in an exhaust passage of the internal combustion engine and able to store oxygen;
   an air-fuel ratio sensor arranged at a downstream side of the catalyst and detecting an air-fuel ratio of an outflowing exhaust gas flowing out from the catalyst;
   a current detection device detecting an output current of the air-fuel ratio sensor;
   a voltage application device applying voltage to the air-fuel ratio sensor;
   a voltage control part configured to control the voltage applied to the air-fuel ratio sensor; and
   an air-fuel ratio control part configured to control the air-fuel ratio of an inflowing exhaust gas flowing into the catalyst, wherein
   the air-fuel ratio control part is configured to control the air-fuel ratio of the inflowing exhaust gas so that the output current of the air-fuel ratio sensor becomes a predetermined target value,
   the voltage control part is configured to perform at least one of voltage lowering control setting the applied voltage to a first voltage lower than a reference voltage when the air-fuel ratio of the outflowing exhaust gas detected by the air-fuel ratio sensor becomes higher than a lean judged air-fuel ratio leaner than a stoichiometric air-fuel ratio, and a voltage raising control setting the applied voltage to a second voltage higher than the reference voltage when the air-fuel ratio of the outflowing exhaust gas detected by the air-fuel ratio sensor becomes lower than a rich judged air-fuel ratio richer than the stoichiometric air-fuel ratio, and
   the reference voltage is a voltage at which the output current of the air-fuel ratio sensor becomes zero when the air-fuel ratio of the outflowing exhaust gas is the stoichiometric air-fuel ratio.

2. The exhaust purification system of an internal combustion engine according to claim 1, wherein the target value is zero.

3. The exhaust purification system of an internal combustion engine according to claim 1, wherein the voltage control part is configured to perform the voltage lowering control and the first voltage is 0.15V to 0.44V.

4. The exhaust purification system of an internal combustion engine according to claim 2, wherein the voltage control part is configured to perform the voltage lowering control and the first voltage is 0.15V to 0.44V.

5. The exhaust purification system of an internal combustion engine according to claim 1, wherein the voltage control part is configured to perform the voltage raising control and the second voltage is 0.46V to 0.7V.

6. The exhaust purification system of an internal combustion engine according to claim 2, wherein the voltage control part is configured to perform the voltage raising control and the second voltage is 0.46V to 0.7V.

7. The exhaust purification system of an internal combustion engine according to claim 3, wherein the voltage control part is configured to perform the voltage raising control and the second voltage is 0.46V to 0.7V.

8. The exhaust purification system of an internal combustion engine according to claim 4, wherein the voltage control part is configured to perform the voltage raising control and the second voltage is 0.46V to 0.7V.

9. The exhaust purification system of an internal combustion engine according to claim 1, further comprising an intake air amount detection device detecting an intake air amount or an intake air amount estimating part configured to estimate the intake air amount, wherein
   the voltage control part is configured to perform the voltage lowering control and lower the first voltage the greater the intake air amount.

10. The exhaust purification system of an internal combustion engine according to claim 2, further comprising an intake air amount detection device detecting an intake air amount or an intake air amount estimating part configured to estimate the intake air amount, wherein
    the voltage control part is configured to perform the voltage lowering control and lower the first voltage the greater the intake air amount.

11. The exhaust purification system of an internal combustion engine according to claim 1, further comprising a catalyst judging part configured to judge a degree of deterioration of the catalyst, wherein
    the voltage control part is configured to perform the voltage lowering control and lower the first voltage the greater the degree of deterioration of the catalyst.

12. The exhaust purification system of an internal combustion engine according to claim 2, further comprising a catalyst judging part configured to judge a degree of deterioration of the catalyst, wherein
    the voltage control part is configured to perform the voltage lowering control and lower the first voltage the greater the degree of deterioration of the catalyst.

13. The exhaust purification system of an internal combustion engine according to claim 1, further comprising an intake air amount detection device detecting an intake air amount or an intake air amount estimating part configured to estimate the intake air amount, wherein
    the voltage control part is configured to perform the voltage raising control and raise the second voltage the greater the intake air amount.

14. The exhaust purification system of an internal combustion engine according to claim 2, further comprising an intake air amount detection device detecting an intake air amount or an intake air amount estimating part configured to estimate the intake air amount, wherein
    the voltage control part is configured to perform the voltage raising control and raise the second voltage the greater the intake air amount.

15. The exhaust purification system of an internal combustion engine according to claim 1, further comprising a catalyst judging part configured to judge a degree of deterioration of the catalyst, wherein
    the voltage control part is configured to perform the voltage raising control and raise the second voltage the greater the degree of deterioration of the catalyst.

16. The exhaust purification system of an internal combustion engine according to claim 2, further comprising a catalyst judging part configured to judge a degree of deterioration of the catalyst, wherein
    the voltage control part is configured to perform the voltage raising control and raise the second voltage the greater the degree of deterioration of the catalyst.

* * * * *